(12) United States Patent
Yu et al.

(10) Patent No.: US 12,135,073 B2
(45) Date of Patent: Nov. 5, 2024

(54) MECHANICAL-DOUBLE RING-HYDRAULIC COMPOSITE TRANSMISSION MECHANISM

(71) Applicant: JIANGSU UNIVERSITY, Zhenjiang (CN)

(72) Inventors: Qing Yu, Zhenjiang (CN); Zhen Zhu, Zhenjiang (CN); Rui Hou, Zhenjiang (CN); Long Chen, Zhenjiang (CN); Yingfeng Cai, Zhenjiang (CN); Xiang Tian, Zhenjiang (CN); Xiaodong Sun, Zhenjiang (CN); Jiangyi Han, Zhenjiang (CN); Changgao Xia, Zhenjiang (CN); Yihan Zhang, Zhenjiang (CN); Jie Sheng, Zhenjiang (CN)

(73) Assignee: JIANGSU UNIVERSITY, Zhenjiang (CN)

( * ) Notice: Subject to any disclaimer, the term of this patent is extended or adjusted under 35 U.S.C. 154(b) by 0 days.

(21) Appl. No.: 18/279,598

(22) PCT Filed: Feb. 28, 2022

(86) PCT No.: PCT/CN2022/078145
§ 371 (c)(1),
(2) Date: Aug. 31, 2023

(87) PCT Pub. No.: WO2023/159534
PCT Pub. Date: Aug. 31, 2023

(65) Prior Publication Data
US 2024/0280166 A1    Aug. 22, 2024

(30) Foreign Application Priority Data
Feb. 25, 2022 (CN) .......................... 202210180053.0

(51) Int. Cl.
*F16H 47/04* (2006.01)
*F16H 37/08* (2006.01)

(52) U.S. Cl.
CPC .......... *F16H 47/04* (2013.01); *F16H 37/084* (2013.01); *F16H 2200/2007* (2013.01); *F16H 2200/2035* (2013.01); *F16H 2200/2053* (2013.01)

(58) Field of Classification Search
CPC ...... F16H 2200/2007; F16H 3/62–3/66; F16H 61/0009; F16H 2200/2053–2061; F16H 47/04
See application file for complete search history.

(56) References Cited

U.S. PATENT DOCUMENTS

| 11,072,231 B1* | 7/2021 | Zhu ......................... F16H 47/04 |
| 2013/0130859 A1* | 5/2013 | Lundberg .............. F16H 37/022 |
| | | 475/214 |

(Continued)

FOREIGN PATENT DOCUMENTS

| CN | 1959148 A | 5/2007 |
| CN | 109296724 A | 2/2019 |

(Continued)

*Primary Examiner* — Ernesto A Suarez
*Assistant Examiner* — Lillian T Nguyen
(74) *Attorney, Agent, or Firm* — Bayramoglu Law Offices LLC

(57) ABSTRACT

A mechanical-double ring-hydraulic composite transmission mechanism includes an input member, a convergence mechanism, a hydraulic transmission mechanism, a double ring mechanism, an output member, a clutch assembly, and a brake assembly. The clutch assembly connects a left planetary gear train to a right planetary gear train. The clutch assembly connects the input member to the hydraulic transmission mechanism, the double ring mechanism, the left planetary gear train, and the right planetary gear train. The clutch assembly connects the hydraulic transmission mecha- (Continued)

nism to the right planetary gear train. The clutch assembly connects the double ring mechanism to the left planetary gear train. The clutch assembly connects the left planetary gear train and the right planetary gear train to the output member. A continuous transmission ratio between the input member and the output member is provided by adjusting a displacement ratio of the hydraulic transmission mechanism.

7 Claims, 21 Drawing Sheets

(56) References Cited

U.S. PATENT DOCUMENTS

| 2016/0109001 | A1* | 4/2016 | Schoolcraft | F16H 37/022 |
| | | | | 475/214 |
| 2021/0188077 | A1* | 6/2021 | Rechenbach | F16H 47/04 |
| 2021/0372512 | A1 | 12/2021 | Zhu et al. | |

FOREIGN PATENT DOCUMENTS

| CN | 110056616 A | 7/2019 |
| CN | 112128337 A | 12/2020 |
| EP | 0563941 A1 | 10/1993 |
| WO | 2021068284 A1 | 4/2021 |

\* cited by examiner

MECHANICAL-DOUBLE RING-HYDRAULIC COMPOSITE TRANSMISSION MECHANISM

CROSS REFERENCE TO THE RELATED APPLICATIONS

This application is the national phase entry of International Application No. PCT/CN2022/078145, filed on Feb. 28, 2022, which is based upon and claims priority to Chinese Patent Application No. 202210180053.0, filed on Feb. 25, 2022, the entire contents of which are incorporated herein by reference.

TECHNICAL FIELD

The present disclosure relates to the field of variable transmission devices, and in particular, to a mechanical-double ring-hydraulic composite transmission device.

BACKGROUND

Mechanical transmissions are high in efficiency, but have difficulty in meeting the requirements of stepless speed regulation; hydraulic transmissions can meet the requirements of stepless speed regulation, but are low in efficiency and accuracy; and ring transmissions are high in efficiency and accuracy, but have a limited transmission ratio adjustment range. Based on this, a variable transmission device that integrates multiple transmission modes and can adapt to different working conditions has a good development prospect.

Composite transmissions can carry forward the advantages and abandon the disadvantages of the single-flow transmissions, and become the development trend of variable transmission devices. A transmission device that integrates multiple transmission modes and can implement composite transmissions by freely combining the transmission modes will be a new trend in the design of the variable transmission devices.

SUMMARY

To eliminate the defects in the prior art, the present disclosure provides a mechanical-double ring-hydraulic composite transmission device, which integrates mechanical transmissions, double ring transmissions, hydraulic transmissions, mechanical-double ring composite transmissions, and mechanical-hydraulic composite transmissions.

The present disclosure achieves the above objective through the following technical solution.

A mechanical-double ring-hydraulic composite transmission mechanism is provided, which includes an input member, a convergence mechanism, a hydraulic transmission mechanism, a double ring mechanism, an output member, a clutch assembly, and a brake assembly, where the convergence mechanism includes a left planetary gear train and a right planetary gear train, the clutch assembly connects the left planetary gear train to the right planetary gear train, the clutch assembly connects the input member to the hydraulic transmission mechanism, the double ring mechanism, the left planetary gear train, and the right planetary gear train, the clutch assembly connects the hydraulic transmission mechanism to the right planetary gear train, the clutch assembly connects the double ring mechanism to the left planetary gear train, and the clutch assembly connects the left planetary gear train and the right planetary gear train to the output member; a continuous transmission ratio between the input member and the output member is provided by adjusting a displacement ratio of the hydraulic transmission mechanism, adjusting a transmission ratio of the double ring transmission mechanism, and selectively controlling engagement of the clutch assembly and the brake assembly.

Further, transmission modes including mechanical transmissions, double ring transmissions, hydraulic transmissions, mechanical-double ring composite transmissions, and mechanical-hydraulic composite transmissions are provided between the input member and the output member by adjusting the displacement ratio of the hydraulic transmission mechanism, adjusting the transmission ratio of the double ring transmission mechanism, and selectively controlling engagement of the clutch assembly and the brake assembly.

Further, the left planetary gear train includes a left ring gear, a left planet carrier, and a left sun gear; the right planetary gear train includes a right ring gear, a right planet carrier, and a right sun gear; the right ring gear is connected to the left planet carrier; and the left sun gear is connected to the right sun gear;

the clutch assembly includes a fifth clutch $C_5$, a sixth clutch $C_6$, a seventh clutch $C_7$, an eighth clutch $C_8$, a ninth clutch $C_9$, a tenth clutch $C_{10}$, and an eleventh clutch $C_{11}$, where the fifth clutch $C_5$ is configured for selectively connecting the input member to the left planet carrier; the sixth clutch $C_6$ is configured for selectively connecting the input member to the right sun gear; the seventh clutch $C_7$ and the eighth clutch $C_8$ are configured for selectively connecting the left ring gear to the output member at different speed ratios; the ninth clutch $C_9$ and the tenth clutch $C_{10}$ are configured for selectively connecting the right planet carrier to the output member at different speed ratios; and the eleventh clutch $C_{11}$ is configured for selectively connecting the left planet carrier to the left sun gear;

the brake assembly includes a first brake $B_1$, a second brake $B_2$, and a third brake $B_3$, where the first brake $B_1$ is configured for selectively connecting the left ring gear to a fixed member; the second brake $B_2$ is configured for selectively connecting the right ring gear to a fixed member; and the third brake $B_3$ is configured for selectively connecting the left planet carrier to a fixed member;

forward mechanical transmission M1 is provided between the input member and the output member by engaging the fifth clutch $C_5$, the seventh clutch $C_7$, and the eleventh clutch $C_{11}$, and rotation speeds of the input member and the output member in the mechanical transmission M1 satisfy the following relationship:

$$n_o = \frac{1}{i_5 i_7} n_I,$$

where $n_o$ is the rotation speed of the output member, $n_I$ is the rotation speed of the input member, $i_5$ is a transmission ratio between the input member and the left planet carrier, and $i_7$ is a transmission ratio between the left ring gear and the output member;

reverse mechanical transmission M2 is provided between the input member and the output member by engaging the fifth clutch $C_5$, the eighth clutch $C_8$, and the eleventh clutch $C_{11}$, and the rotation speeds of the input member and the output member in the mechanical transmission M2 satisfy the following relationship:

$$n_o = -\frac{1}{i_5 i_8 i_9} n_I,$$

where $i_8 i_9$ is a transmission ratio between the left ring gear and the output member.

Further, the clutch assembly further includes a first clutch $C_1$ and a second clutch $C_2$, where the first clutch $C_1$ is configured for selectively connecting the input member to an input end of the double ring mechanism, and the second clutch $C_2$ is configured for selectively connecting an output end of the double ring mechanism to the left planet carrier;

reverse double ring transmission T1 is provided between the input member and the output member by adjusting the transmission ratio of the double ring mechanism and engaging the first clutch $C_1$, the second clutch $C_2$, the ninth clutch $C_9$, and the first brake $B_1$, and the rotation speeds of the input member and the output member in the double ring transmission T1 satisfy the following relationship:

$$n_o = -\frac{1+k_1+k_2}{(1+k_2)i_1 i_2 i_{10} i_{T_1} i_{T_2}} n_I,$$

where $k_1$ is a planetary gear characteristic parameter of the left planetary gear train, $k_2$ is a planetary gear characteristic parameter of the right planetary gear train, $i_1$ is a transmission ratio between the input member and the input end of the double ring mechanism, $i_2$ is a transmission ratio between the output end of the double ring mechanism and the left planet carrier, $i_{10}$ is a transmission ratio between the right planet carrier and the output member, and $i_{T_1} i_{T_2}$ is the transmission ratio of the double ring mechanism;

reverse double ring transmission T3 is provided between the input member and the output member by adjusting the transmission ratio of the double ring mechanism and engaging the first clutch $C_1$, the second clutch $C_2$, the eleventh clutch $C_{11}$, and the ninth clutch $C_9$, and the rotation speeds of the input member and the output member in the double ring transmission T3 satisfy the following relationship:

$$n_o = -\frac{1}{i_1 i_2 i_7 i_{T_1} i_{T_2}} n_I;$$

forward double ring transmission T2 is provided between the input member and the output member by adjusting the transmission ratio of the double ring mechanism and engaging the first clutch $C_1$, the second clutch $C_2$, the first brake $B_1$, and the tenth clutch $C_{10}$, and the rotation speeds of the input member and the output member in the double ring transmission T2 satisfy the following relationship:

$$n_o = \frac{1+k_1+k_2}{(1+k_2)i_1 i_2 i_{11} i_{12} i_{T_1} i_{T_2}} n_I,$$

where $i_{11} i_{12}$ is a transmission ratio between the right planet carrier and the output member;

forward double ring transmission T4 is provided between the input member and the output member by adjusting the transmission ratio of the double ring mechanism and engaging the first clutch $C_1$, the second clutch $C_2$, the tenth clutch $C_{10}$, and the eleventh clutch $C_{11}$, and the rotation speeds of the input member and the output member in the double ring transmission T4 satisfy the following relationship:

$$n_o = \frac{1}{i_1 i_2 i_8 i_9 i_{T_1} i_{T_2}} n_I.$$

Further, the clutch assembly further includes a third clutch $C_3$ and a fourth clutch $C_4$, where the third clutch $C_3$ connects the input member to an input end of the hydraulic transmission mechanism, and the fourth clutch $C_4$ connects an output end of the hydraulic transmission mechanism to the right sun gear;

reverse hydraulic transmission H1 is provided between the input member and the output member by adjusting the displacement ratio of the hydraulic transmission mechanism and engaging the third clutch $C_3$, the fourth clutch $C_4$, the ninth clutch $C_9$, the second brake $B_2$, and the third brake $B_3$, and the rotation speeds of the input member and the output member in the hydraulic transmission H1 satisfy the following relationship:

$$n_o = -\frac{e}{(1+k_2)i_3 i_4 i_{10}} n_I,$$

where $e$ is the displacement ratio of the hydraulic transmission mechanism, $i_3$ is a transmission ratio between the input member and the input end of the hydraulic transmission mechanism, and $i_4$ is a transmission ratio between the output end of the hydraulic transmission mechanism and the right sun gear;

reverse hydraulic transmission H3 is provided between the input member and the output member by adjusting the displacement ratio of the hydraulic transmission mechanism and engaging the third clutch $C_3$, the fourth clutch $C_4$, the ninth clutch $C_9$, and the eleventh clutch $C_{11}$, and the rotation speeds of the input member and the output member in the hydraulic transmission H3 satisfy the following relationship:

$$n_o = -\frac{e}{i_3 i_4 i_{10}} n_I;$$

forward hydraulic transmission H2 is provided between the input member and the output member by adjusting the displacement ratio of the hydraulic transmission mechanism and engaging the third clutch $C_3$, the fourth clutch $C_4$, the tenth clutch $C_{10}$, the second brake $B_2$, and the third brake $B_3$, and the rotation speeds of the input member and the output member in the hydraulic transmission H2 satisfy the following relationship:

$$n_o = \frac{e}{(1+k_2)i_3 i_4 i_{11} i_{12}} n_I;$$

forward hydraulic transmission H4 is provided between the input member and the output member by adjusting the displacement ratio of the hydraulic transmission mechanism and engaging the third clutch $C_3$, the fourth clutch $C_4$, the tenth clutch $C_{10}$, and the eleventh clutch $C_{11}$, and the rotation speeds of the input member and the output member in the hydraulic transmission H4 satisfy the following relationship:

$$n_o = \frac{e}{i_3 i_4 i_{11} i_{12}} n_I.$$

Further, reverse mechanical-double ring composite transmission MT1 is provided between the input member and the output member by adjusting the transmission ratio of the double ring mechanism and engaging the first clutch $C_1$, the second clutch $C_2$, the sixth clutch $C_6$, and the seventh clutch $C_7$, and the rotation speeds of the input member and the output member in the mechanical-double ring composite transmission MT1 satisfy the following relationship:

$$n_o = -\frac{(1+k_1)i_6 + i_1 i_2 i_{T_1} i_{T_2}}{k_1 i_1 i_2 i_6 i_7 i_{T_1} i_{T_2}} n_I;$$

reverse mechanical-double ring composite transmission MT3 is provided between the input member and the output member by adjusting the transmission ratio of the double ring mechanism and engaging the first clutch $C_1$, the second clutch $C_2$, the sixth clutch $C_6$, and the ninth clutch $C_9$, and the rotation speeds of the input member and the output member in the mechanical-double ring composite transmission MT3 satisfy the following relationship:

$$n_o = -\frac{k_2 i_6 - i_1 i_2 i_{T_1} i_{T_2}}{(1+k_2) i_1 i_2 i_6 i_{10} i_{T_1} i_{T_2}} n_I;$$

forward mechanical-double ring composite transmission MT2 is provided between the input member and the output member by adjusting the transmission ratio of the double ring mechanism and engaging the first clutch $C_1$, the second clutch $C_2$, the sixth clutch $C_6$, and the eighth clutch $C_8$, and the rotation speeds of the input member and the output member in the mechanical-double ring composite transmission MT2 satisfy the following relationship:

$$n_o = \frac{(1+k_1)i_6 - i_1 i_2 i_{T_1} i_{T_2}}{k_1 i_1 i_2 i_6 i_8 i_9 i_{T_1} i_{T_2}} n_I;$$

forward mechanical-double ring composite transmission MT4 is provided between the input member and the output member by adjusting the transmission ratio of the double ring mechanism and engaging the first clutch $C_1$, the second clutch $C_2$, the sixth clutch $C_6$, and the tenth clutch $C_{10}$, and the rotation speeds of the input member and the output member in the mechanical-double ring composite transmission MT4 satisfy the following relationship:

$$n_o = \frac{k_2 i_6 - i_1 i_2 i_{T_1} i_{T_2}}{(1+k_2) i_1 i_2 i_6 i_{11} i_{12} i_{T_1} i_{T_2}} n_I.$$

Further, forward mechanical-hydraulic composite transmission MH1 is provided between the input member and the output member by adjusting the displacement ratio of the hydraulic transmission mechanism and engaging the third clutch $C_3$, the fourth clutch $C_4$, the fifth clutch $C_5$, and the seventh clutch $C_7$, and the rotation speeds of the input member and the output member in the mechanical-hydraulic composite transmission MH1 satisfy the following relationship:

$$n_o = \frac{(1+k_1)i_3 i_4 + i_5 e}{k_1 i_3 i_4 i_5 i_7} n_I;$$

forward mechanical-hydraulic composite transmission MH3 is provided between the input member and the output member by adjusting the displacement ratio of the hydraulic transmission mechanism and engaging the third clutch $C_3$, the fourth clutch $C_4$, the fifth clutch $C_5$, and the ninth clutch $C_9$, and the rotation speeds of the input member and the output member in the mechanical-hydraulic composite transmission MH3 satisfy the following relationship:

$$n_o = \frac{k_2 i_3 i_4 - i_5 e}{(1+k_2)i_3 i_4 i_5 i_{10}} n_I;$$

reverse mechanical-hydraulic composite transmission MH2 is provided between the input member and the output member by adjusting the displacement ratio of the hydraulic transmission mechanism and engaging the third clutch $C_3$, the fourth clutch $C_4$, the fifth clutch $C_5$, and the eighth clutch $C_8$, and the rotation speeds of the input member and the output member in the mechanical-hydraulic composite transmission MH2 satisfy the following relationship:

$$n_o = -\frac{(1+k_1)i_3 i_4 + i_5 e}{k_1 i_3 i_4 i_5 i_8 i_9} n_I;$$

reverse mechanical-hydraulic composite transmission MH4 is provided between the input member and the output member by adjusting the displacement ratio of the hydraulic transmission mechanism and engaging the third clutch $C_3$, the fourth clutch $C_4$, the fifth clutch $C_5$, and the tenth clutch $C_{10}$, and the rotation speeds of the input member and the output member in the mechanical-hydraulic composite transmission MH4 satisfy the following relationship:

$$n_o = -\frac{k_2 i_3 i_4 - i_5 e}{(1+k_2)i_3 i_4 i_5 i_{11} i_{12}} n_I.$$

Further, by adjusting the displacement ratio of the hydraulic transmission mechanism, adjusting the transmission ratio of the double ring transmission mechanism, and selectively controlling engagement of the clutch assembly and the brake assembly, the hydraulic transmission H4 is adopted for startup, the output speed increases linearly with the increase of the displacement ratio e of the hydraulic transmission mechanism, and when e=1, the hydraulic transmission H4 reaches a positive maximum value;

when e·$i_T$∈[$n_o$(H4)=$n_o$(T4)], e∈[0, 1], and $i_{T_1} i_{T_2}$ falls in a determined transmission ratio range, the hydraulic transmission H4 is configured for being synchronously switched to the double ring transmission T4, and when the transmission ratio $i_{T_1} i_{T_2}$, of the double ring transmission mechanism changes from a maximum value to a minimum value, $n_o$(T4) increases nonlinearly; when e·$i_T$∈[$n_o$(T4)=$n_o$(T2)] and $i_{T_1} i_{T_2}$ falls in a determined transmission ratio range, the double ring transmission T2 is configured for being synchronously switched to the double ring transmission T4, and when the transmission ratio $i_T$ of the double ring transmission mechanism changes from the maximum value to the minimum value, $n_o$(T4) increases nonlinearly;

when the hydraulic transmission H3 is adopted for reverse startup, the output speed increases linearly with the increase of the displacement ratio e of the hydraulic transmission mechanism, and when e=1, the hydraulic transmission H3 reaches a negative maximum value; when e·$i_T$∈[$n_o$(H3)=$n_o$(T3)], e∈[0, 1], and $i_{T_1} i_{T_2}$ falls in a determined transmission ratio range, the hydraulic transmission H3 is configured for being synchronously switched to the double ring transmission T3, and when the transmission ratio $i_{T_1} i_{T_2}$ of the double ring transmission mechanism changes from the maximum value to the minimum value, $n_o$(T3) increases nonlinearly;

when the double ring transmission T1 is adopted for reverse movement, the output speed increases linearly with the increase of the transmission ratio $i_T$ of the double ring transmission mechanism, and when $i_{T_1} i_{T_2}$=max, the double ring transmission T1 reaches a negative maximum value; when e·$i_T$∈[$n_o$(T3)=$n_o$(T1)] and $i_{T_1} i_{T_2}$ falls in a determined transmission ratio range, the double ring transmission T1 is configured for being synchronously switched to the double ring transmission T3, and when the transmission ratio $i_{T_1} i_{T_2}$ of the double ring transmission mechanism changes from the maximum value to the minimum value, $n_o$(T3) increases nonlinearly.

Further, by adjusting the displacement ratio of the hydraulic transmission mechanism, adjusting the transmission ratio of the double ring transmission mechanism, and selectively controlling engagement of the clutch assembly and the brake assembly, the mechanical-hydraulic composite transmission MH1 is adopted for forward movement, the output speed increases linearly with the increase of the displacement ratio e of the hydraulic transmission mechanism, and when e=1, the mechanical-hydraulic composite transmission MH1 reaches a positive maximum value; when the mechanical-double ring composite transmission MT2 is adopted for forward movement, the output speed increases nonlinearly with the increase of $i_T$; when e·$i_T$∈[$n_o$(MT2)=$n_o$(MH3)], e∈[0, 1], and $i_{T_1} i_{T_2}$ falls in a determined transmission ratio range, the mechanical-double ring composite transmission MT2 is configured for being synchronously switched to the mechanical-hydraulic composite transmission MH3, and when the displacement ratio e of the hydraulic transmission mechanism changes from a maximum value to a minimum value, $n_o$(MH3) increases linearly; when e·$i_T$∈[$n_o$(MT4)=$n_o$(MH3)], e∈[0, 1], and $i_{T_1} i_{T_2}$ falls in a determined transmission ratio range, the mechanical-hydraulic composite transmission MH3 is configured for being synchronously switched to the mechanical-double ring composite transmission MT4, and the output speed decreases nonlinearly with the increase of the transmission ratio $i_T$ of the double ring transmission mechanism;

when the mechanical-hydraulic composite transmission MH2 is adopted for reverse movement, the output speed increases linearly with the increase of the displacement ratio e of the hydraulic transmission mechanism, and when e=1, the mechanical-hydraulic composite transmission MH2 reaches a negative maximum value; when the mechanical-double ring composite transmission MT1 is adopted for reverse movement, the output speed increases nonlinearly with the increase of $i_{T_1} i_{T_2}$; when e·$i_T$∈[$n_o$(MT1)=$n_o$(MH4)], e∈[0, 1], and $i_{T_1} i_{T_2}$ falls in a determined transmission ratio range, the mechanical-double ring composite transmission MT1 is configured for being synchronously switched to the mechanical-hydraulic composite transmission MH4; when the displacement ratio e of the hydraulic transmission mechanism changes from the maximum value to the minimum value, $n_o$(MH4) increases linearly; when e·$i_T$∈[$n_o$(MT3)=$n_o$(MH4)], e∈[0, 1], and $i_{T_1} i_{T_2}$ falls in a determined transmission ratio range, the mechanical-hydraulic composite transmission MH4 is configured for being synchronously switched to the mechanical-double ring composite transmission MT3, and the output speed decreases nonlinearly with the increase of the transmission ratio $i_{T_1} i_{T_2}$ of the double ring transmission mechanism.

The present disclosure has the following advantages.
1. According to the mechanical-double ring-hydraulic composite transmission device of the present disclosure, the double ring transmission adopts a front ring transmission mechanism and a rear ring transmission mechanism that are connected in series, which enlarges the transmission ratio adjustment range and improves the adjustment accuracy and the degree of freedom.
2. The mechanical-double ring-hydraulic composite transmission device of the present disclosure integrates mechanical transmissions, double ring transmissions, hydraulic transmissions, mechanical-double ring composite transmissions, and mechanical-hydraulic composite transmissions.
3. The mechanical-double ring-hydraulic composite transmission device of the present disclosure can realize free switching between various transmission modes.

BRIEF DESCRIPTION OF THE DRAWINGS

To illustrate the technical solutions in the embodiments of the present disclosure or in the prior art more clearly, the accompanying drawings required for the description of the embodiments or the prior art are introduced briefly in the following. Apparently, the accompanying drawings in the following description show some embodiments of the present disclosure, and persons of ordinary skill in the art can derive other drawings from the accompanying drawings without creative efforts.

In the drawings.

Figure 1:
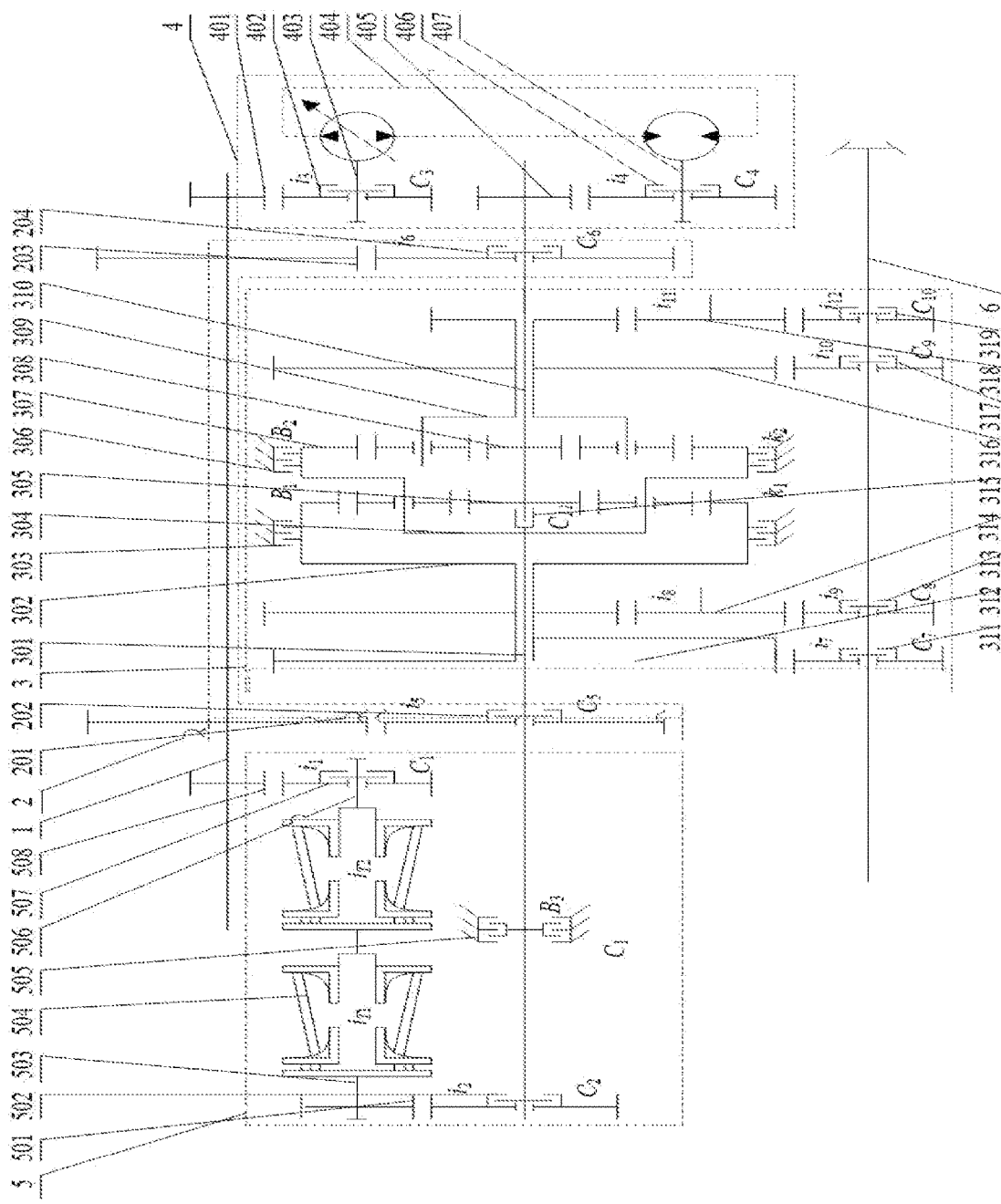
FIG. 1 is a schematic structural diagram of a mechanical-double ring-hydraulic composite transmission device according to the present disclosure.

1. input shaft; 2. mechanical transmission mechanism; 3. convergence mechanism; 4. hydraulic transmission mechanism; 5. double ring mechanism; 6. output shaft; 201. mechanical transmission left gear pair; 202. fifth clutch $C_5$; 203. mechanical transmission right gear pair; 204. sixth clutch $C_6$; 301. left planet carrier shaft; 302. left ring gear; 303. first brake $B_1$; 304. left planet carrier; 305. left sun gear; 306. second brake $B_2$; 307. right ring gear; 308. right sun gear; 309. right planet carrier; 310. right sun gear shaft; 311. seventh clutch $C_7$; 312. first convergence output gear pair; 313. eighth clutch $C_8$; 314. second convergence output gear pair; 315. eleventh clutch $C_{11}$; 316. third convergence output gear pair; 317. ninth clutch $C_9$; 318. fourth convergence output gear pair; 319. tenth clutch $C_{10}$; 401. hydraulic transmission input gear pair; 402. third clutch $C_3$; 403. hydraulic pump input shaft; 404. pump-controlled motor mechanism; 405. hydraulic transmission output gear pair; 406. fourth clutch $C_4$; 407. hydraulic motor output shaft; 501. double ring output gear pair; 502. second clutch $C_2$; 503. double ring output shaft; 504. ring mechanism; 505. third brake $B_3$; 506. double ring input shaft; 507. first clutch $C_1$; 508. double ring input gear pair.

DETAILED DESCRIPTION OF THE EMBODIMENTS

The present disclosure is further described below with reference to the accompanying drawings and specific embodiments, but the protection scope of the present disclosure is not limited thereto.

Embodiments of the present disclosure are described in detail below and are exemplified in the accompanying drawings, where the same or similar reference signs indicate the same or similar elements or elements with the same or similar functions. The embodiments described below with reference to the accompanying drawings are exemplary and are intended to explain the present disclosure, instead of limiting the present disclosure.

In the description of the present disclosure, it should be understood that terms such as "central", "longitudinal", "transverse", "length", "width", "thickness", "upper", "lower", "axial", "radial", "vertical", "horizontal", "inner", and "outer" indicate directional or positional relationships based on the accompanying drawings. They are merely used for the convenience and simplicity of the description of the present disclosure, instead of indicating or implying that the demonstrated device or element is located in a specific direction or is constructed and operated in a specific direction. Therefore, they cannot be construed as limitations to the present disclosure. Moreover, terms "first" and "second" are merely used for the purpose of description, and cannot be understood as indicating or implying relative importance or implicitly indicating the number of denoted technical features. Therefore, a feature defined by "first" or "second" explicitly or implicitly includes one or more such features. In the description of the present disclosure, "a plurality of" means two or above two, unless otherwise expressly defined.

In the present disclosure, unless otherwise expressly specified and defined, terms such as "mounted", "interconnected", "connected", and "fixed" should be understood in a broad sense. For example, they may be fixed connections, detachable connections, or integral connections; may be mechanical connections or electrical connections; may be direct connections or indirect connections through an intermediate medium; and may be internal communications between two elements. The specific meanings of the above terms in the present disclosure can be understood by persons of ordinary skill in the art according to specific situations.

As shown in FIG. 1, the mechanical-double ring-hydraulic composite transmission device of the present disclosure includes an input shaft 1, a mechanical transmission mechanism 2, a convergence mechanism 3, a hydraulic transmission mechanism 4, a double ring mechanism 5, an output shaft 6, a clutch assembly, and a brake assembly.

The mechanical transmission mechanism 2 includes a mechanical transmission left gear pair 201, a fifth clutch $C_5$ 202, a mechanical transmission right gear pair 203, and a sixth clutch $C_6$ 204. The convergence mechanism 3 includes a left planet carrier shaft 301, a left ring gear 302, a first brake $B_1$ 303, a left planet carrier 304, a left sun gear 305, a second brake $B_2$ 306, a third brake $B_3$ 505, a right ring gear 307, a right sun gear 308, a right planet carrier 309, a right sun gear shaft 310, a seventh clutch $C_7$ 311, a first convergence output gear pair 312, an eighth clutch $C_8$ 313, a second convergence output gear pair 314, an eleventh clutch $C_{11}$ 315, a third convergence output gear pair 316, a ninth clutch $C_9$ 317, a fourth convergence output gear pair 318, and a tenth clutch $C_{10}$ 319. The right ring gear 307 is connected to the left planet carrier 304. The left sun gear 305 is connected to the right sun gear 308.

The fifth clutch $C_5$ 202 is configured for selectively connecting the input shaft 1 to the left planet carrier shaft 301 of the left planet carrier 304 through the mechanical transmission left gear pair 201. The sixth clutch $C_6$ 204 is configured for selectively connecting the input shaft 1 to the right sun gear shaft 310 of the right sun gear 308 through the mechanical transmission right gear pair 203. The seventh clutch $C_7$ 311 is configured for selectively connecting the left ring gear 302 to the output shaft 6 through the first convergence output gear pair 312. The eighth clutch $C_8$ 313 is configured for selectively connecting the left ring gear 302 to the output shaft 6 through the second convergence output gear pair 314. The ninth clutch $C_9$ 317 is configured for selectively connecting the right planet carrier 309 to the output shaft 6 through the third convergence output gear pair 316. The tenth clutch $C_{10}$ 319 is configured for selectively connecting the right planet carrier 309 to the output shaft 6 through the fourth convergence output gear pair 318. The eleventh clutch $C_{11}$ 315 is configured for selectively connecting the left planet carrier 304 to the left sun gear 305. The first brake $B_1$ 303 is configured for selectively connecting the left ring gear 302 to a fixed member. The second brake $B_2$ 306 is configured for selectively connecting the right ring gear 307 to a fixed member. The third brake $B_3$ 505 is configured for selectively connecting the left planet carrier 304 to a fixed member.

The hydraulic transmission mechanism 4 includes a hydraulic transmission input gear pair 401, a third clutch $C_3$ 402, a hydraulic pump input shaft 403, a hydraulic transmission output gear pair 405, a fourth clutch $C_4$ 406, and a hydraulic motor output shaft 407.

The third clutch $C_3$ 402 connects the input shaft 1 to the hydraulic pump input shaft 403 through the hydraulic transmission input gear pair 401. The fourth clutch $C_4$ 406 connects the hydraulic motor output shaft 407 to the right sun gear 308 through the hydraulic transmission output gear pair 405.

The double ring transmission mechanism 5 includes a double ring output gear pair 501, a second clutch $C_2$ 502, a double ring output shaft 503, a ring mechanism 504, a double ring input shaft 506, a first clutch $C_1$ 507, and a double ring input gear pair 508. The first clutch $C_1$ 507 is configured for connecting the double ring input shaft 506 to the input shaft 1. The second clutch $C_2$ 502 is configured for connecting the double ring output gear pair 501 to the double ring output shaft 503.

Transmission modes including mechanical transmissions, double ring transmissions, hydraulic transmissions, mechanical-double ring composite transmissions, and mechanical-hydraulic composite transmissions are provided between the input shaft 1 and the output shaft 6 by adjusting the transmission ratio of the double ring mechanism 5, adjusting the displacement ratio of the hydraulic transmission mechanism 4, and selectively controlling engagement of the clutch assembly and the brake assembly. The engaged components in each transmission mode are shown in Table 1. The details are as follows:

TABLE 1

Engagement state of mode-switching components

| Mode | C1 | C2 | C3 | C4 | C5 | C6 | C7 | C8 | C9 | C10 | C11 | B1 | B2 | B3 | Input-output speed relationship |
|---|---|---|---|---|---|---|---|---|---|---|---|---|---|---|---|
| Mechanical M1 | △ | △ | △ | △ | ▲ | △ | ▲ | △ | △ | △ | ▲ | △ | △ | △ | $n_o(M1) = \dfrac{1}{i_5 i_7} n_I$ |
| Mechanical M2 | △ | △ | △ | △ | ▲ | △ | △ | ▲ | △ | △ | ▲ | △ | △ | △ | $n_o(M2) = -\dfrac{1}{i_5 i_8 i_9} n_I$ |
| Double ring T1 | ▲ | ▲ | △ | △ | △ | △ | △ | △ | ▲ | △ | △ | ▲ | △ | △ | $n_o(T1) = -\dfrac{1 + k_1 + k_2}{(1+k_2) i_1 i_2 i_{10} i_{T_1} i_{T_2}} n_I$ |
| Double ring T2 | ▲ | ▲ | △ | △ | △ | △ | △ | △ | △ | ▲ | △ | ▲ | △ | △ | $n_o(T2) = -\dfrac{1 + k_1 + k_2}{(1+k_2) i_1 i_2 i_{11} i_{12} i_{T_1} i_{T_2}} n_I$ |
| Double ring T3 | ▲ | ▲ | △ | △ | △ | △ | △ | ▲ | △ | △ | ▲ | △ | △ | △ | $n_o(T3) = -\dfrac{1}{i_1 i_2 i_7 i_{T_1} i_{T_2}} n_I$ |
| Double ring T4 | ▲ | ▲ | △ | △ | △ | △ | △ | △ | ▲ | ▲ | △ | △ | △ | △ | $n_o(T4) = \dfrac{1}{i_1 i_2 i_8 i_9 i_{T_1} i_{T_2}} n_I$ |
| Hydraulic H1 | △ | △ | ▲ | ▲ | △ | △ | △ | ▲ | △ | △ | △ | △ | ▲ | ▲ | $n_o(H1) = -\dfrac{e}{(1+k_2) i_3 i_4 i_{10}} n_I$ |
| Hydraulic H2 | △ | △ | ▲ | ▲ | △ | △ | △ | △ | △ | △ | ▲ | △ | ▲ | ▲ | $n_o(H2) = \dfrac{e}{(1+k_2) i_3 i_4 i_{11} i_{12}} n_I$ |
| Hydraulic H3 | △ | △ | ▲ | ▲ | △ | △ | △ | △ | ▲ | △ | ▲ | △ | △ | △ | $n_o(H3) = -\dfrac{e}{i_3 i_4 i_{10}} n_I$ |

TABLE 1-continued

Engagement state of mode-switching components

| | State of execution components | | | | | | | | | | | | | Input-output speed relationship |
|---|---|---|---|---|---|---|---|---|---|---|---|---|---|---|
| Mode | C1 | C2 | C3 | C4 | C5 | C6 | C7 | C8 | C9 | C10 | C11 | B1 | B2 | B3 | |
| Hydraulic H4 | △ | △ | ▲ | ▲ | △ | △ | △ | △ | △ | ▲ | ▲ | △ | △ | △ | $n_o(H4) = \dfrac{e}{i_3 i_4 i_{11} i_{12}} n_I$ |
| Mechanical-double ring MT1 | ▲ | ▲ | △ | △ | △ | ▲ | ▲ | △ | △ | △ | △ | △ | △ | △ | $n_o(MT1) = -\dfrac{(1+k_1)i_6 + i_1 i_2 i_{T_1} i_{T_2}}{k_1 i_1 i_2 i_6 i_7 i_{T_1} i_{T_2}} n_I$ |
| Mechanical-double ring MT2 | ▲ | ▲ | △ | △ | △ | ▲ | △ | ▲ | △ | △ | △ | △ | △ | △ | $n_o(MT2) = \dfrac{(1+k_1)i_6 - i_1 i_2 i_{T_1} i_{T_2}}{k_1 i_1 i_2 i_6 i_8 i_9 i_{T_1} i_{T_2}} n_I$ |
| Mechanical-double ring MT3 | ▲ | ▲ | △ | △ | △ | ▲ | △ | △ | ▲ | △ | △ | △ | △ | △ | $n_o(MT3) = -\dfrac{k_2 i_6 - i_1 i_2 i_{T_1} i_{T_2}}{(1+k_2) i_1 i_2 i_6 i_{10} i_{T_1} i_{T_2}} n_I$ |
| Mechanical-double ring MT4 | ▲ | ▲ | △ | △ | △ | ▲ | △ | △ | △ | △ | ▲ | △ | △ | △ | $n_o(MT4) = \dfrac{k_2 i_6 - i_1 i_2 i_{T_1} i_{T_2}}{(1+k_2) i_1 i_2 i_6 i_{11} i_{12} i_{T_1} i_{T_2}} n_I$ |
| Mechanical-hydraulic MH1 | △ | △ | ▲ | ▲ | ▲ | △ | ▲ | △ | △ | △ | △ | △ | △ | △ | $n_o(MH1) = \dfrac{(1+k_1)i_3 i_4 + i_5 e}{k_1 i_3 i_4 i_5 i_7} n_I$ |
| Mechanical-hydraulic MH2 | △ | △ | ▲ | ▲ | ▲ | △ | △ | ▲ | △ | △ | △ | △ | △ | △ | $n_o(MH2) = -\dfrac{(1+k_1)i_3 i_4 + i_5 e}{k_1 i_3 i_4 i_5 i_8 i_9} n_I$ |
| Mechanical-hydraulic MH3 | △ | △ | ▲ | ▲ | ▲ | △ | △ | △ | ▲ | △ | △ | △ | △ | △ | $n_o(MH3) = \dfrac{k_2 i_3 i_4 - i_5 e}{(1+k_2) i_3 i_4 i_5 i_{10}} n_I$ |
| Mechanical-hydraulic MH4 | △ | △ | ▲ | ▲ | ▲ | △ | △ | △ | △ | △ | ▲ | △ | △ | △ | $n_o(MH4) = -\dfrac{k_2 i_3 i_4 - i_5 e}{(1+k_2) i_3 i_4 i_5 i_{11} i_{12}} n_I$ |

In Table 1: ▲ indicates that the execution component is engaged and △ indicates that the execution component is disengaged; $n_o(M1)$ is the output speed in the mechanical transmission M1, $n_o(M2)$ is the output speed in the mechanical transmission M2, $n_o(T1)$ is the output speed in the double ring transmission T1, $n_o(T2)$ is the output speed in the double ring transmission T2, $n_o(T3)$ is the output speed in the double ring transmission T3, $n_o(T4)$ is the output speed in the double ring transmission T4, $n_o(H1)$ is the output speed in the hydraulic transmission H1, $n_o(H2)$ is the output speed in the hydraulic transmission H2, $n_o(H3)$ is the output speed in the hydraulic transmission H3, $n_o(H4)$ is the output speed in the hydraulic transmission H4, $n_o(MT1)$ is the output speed in the mechanical-double ring transmission MT1, $n_o(MT2)$ is the output speed in the mechanical-double ring transmission MT2, $n_o(MT3)$ is the output speed in the mechanical-double ring transmission MT3, $n_o(MT4)$ is the output speed in the mechanical-double ring transmission MT4, $n_o(MH1)$ is the output speed in the mechanical-hydraulic transmission MH1, $n_o(MH2)$ is the output speed in the mechanical-hydraulic transmission MH2, $n_o(MH3)$ is the output speed in the mechanical-hydraulic transmission MH3, $n_o(MH4)$ is the output speed in the mechanical-hydraulic transmission MH4, $n_1$ is the engine speed, $k_1$ is the planetary gear characteristic parameter of the left planetary gear mechanism in the convergence mechanism, $k_2$ is the planetary gear characteristic parameter of the right planetary gear mechanism in the convergence mechanism, $i_1$ is the transmission ratio of the double ring input gear pair 508, $i_2$ is the transmission ratio of the double ring output gear pair 501, $i_3$ is the transmission ratio of the hydraulic transmission input gear pair 401, $i_4$ the transmission ratio of the hydraulic transmission output gear pair 405, $i_5$ is the transmission ratio of the mechanical transmission left gear pair 201, $i_6$ is the transmission ratio of the mechanical transmission right gear pair 203, $i_7$ is the transmission ratio of the first convergence output gear pair 312, $i_8 i_9$ is the transmission ratio of the second convergence output gear pair 314, $i_{10}$ is the transmission ratio of the third convergence output gear pair 316, $i_{11} i_{12}$ is the transmission ratio of the fourth convergence output gear pair 318, $i_{T_1} i_{T_2}$ is the transmission ratio of the ring mechanism 504, and e is the displacement ratio of the hydraulic transmission mechanism.

Figure 2:
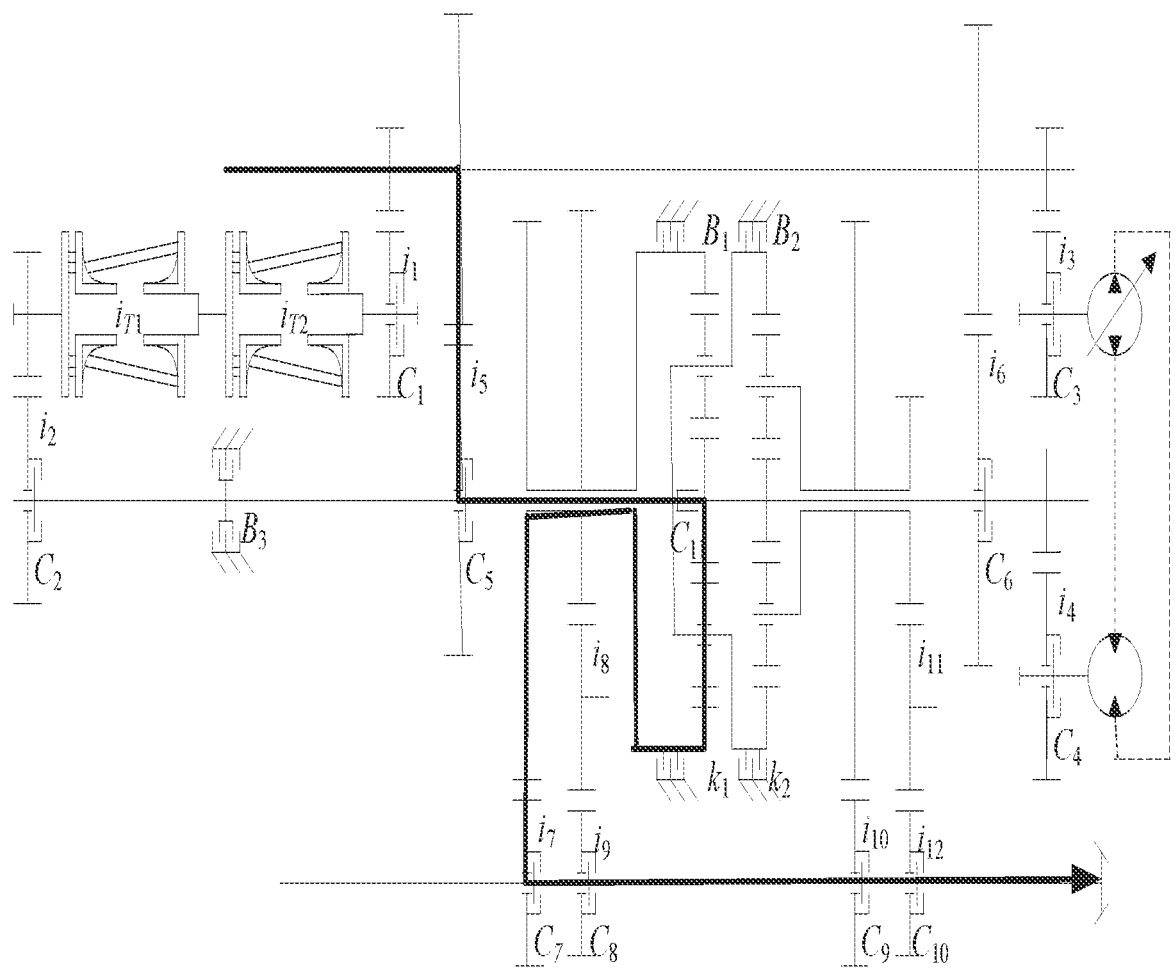
FIG. 2 is a schematic diagram showing the power flow in mechanical transmission M1 according to the present disclosure.

The mechanical transmission M1 is shown in FIG. 2, where only the fifth clutch $C_5$ 202, the seventh clutch $C_7$ 311, and the eleventh clutch $C_{11}$ 315 are engaged. The engine power transmitted by the input shaft 1 passes through the mechanical transmission left gear pair 201 and the fifth clutch $C_5$ 202 to drive the left planet carrier 304. Since the left and right planetary gears of the convergence mechanism 3 are fixedly connected as a whole, the power is transmitted to the first convergence output gear pair 312, then transmitted through the seventh clutch $C_7$ 311 to the output shaft 6, and finally output from the output shaft 6.

Figure 3:
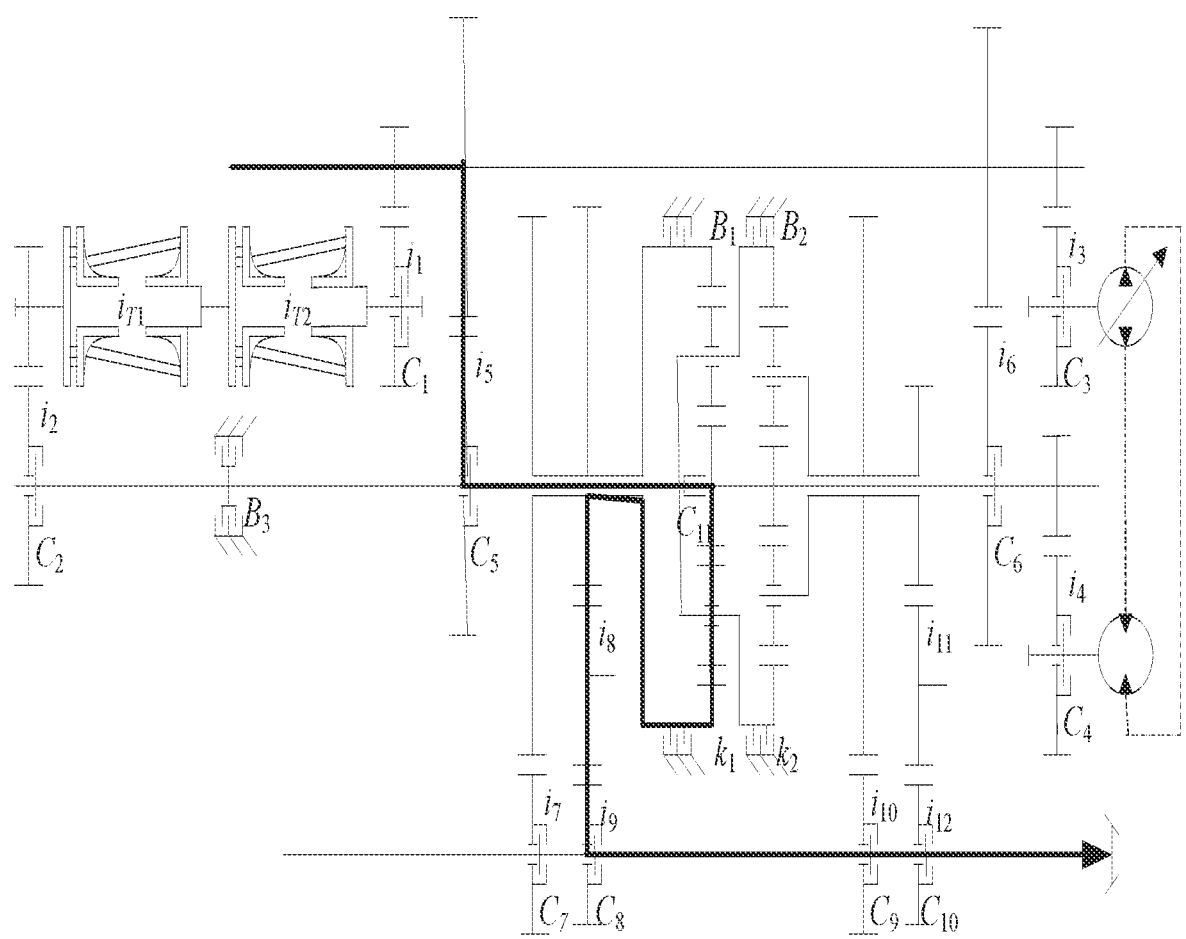
FIG. 3 is a schematic diagram showing the power flow in mechanical transmission M2 according to the present disclosure.

The mechanical transmission M2 is shown in FIG. 3, where only the fifth clutch $C_5$ 202, the eighth clutch $C_8$ 313, and the eleventh clutch Cn 315 are engaged. The engine power transmitted by the input shaft 1 passes through the mechanical transmission left gear pair 201 and the fifth clutch $C_5$ 202 to drive the left planet carrier 304. Since the left and right planetary gears of the convergence mechanism 3 are fixedly connected as a whole, the power is transmitted to the second convergence output gear pair 314, then transmitted through the eighth clutch $C_8$ 313 to the output shaft 6, and finally output from the output shaft 6.

Figure 4:
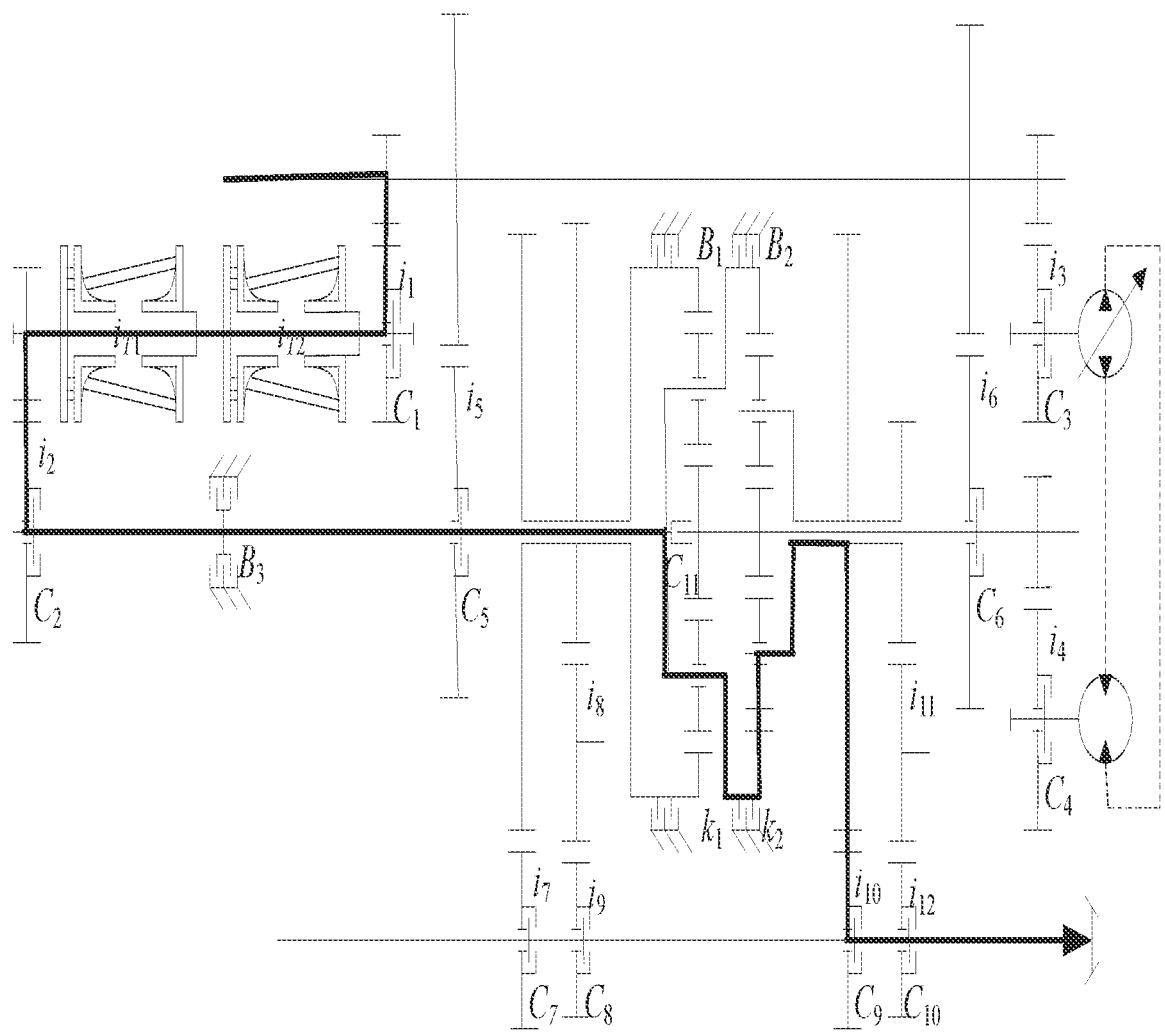
FIG. 4 is a schematic diagram showing the power flow in double ring transmission T1 according to the present disclosure.

The double ring transmission T1 is shown in FIG. 4, where only the first clutch $C_1$ 507, the second clutch $C_2$ 502, the ninth clutch $C_9$ 317, and the first brake $B_1$ 303 are engaged. The engine power transmitted by the input shaft 1 passes through the double ring input gear pair 508, the double ring input shaft 506, the first clutch $C_1$ 507, the double ring mechanism 504, the double ring output gear pair 501, and the second clutch $C_2$ 502 to drive the left planet carrier 304 of the convergence mechanism 3. Then, the power is transmitted through the right ring gear 307, the right planet carrier 309, the third convergence output gear pair 316, and the ninth clutch $C_9$ 317 to the output shaft 6 and is output from the output shaft 6.

Figure 5:
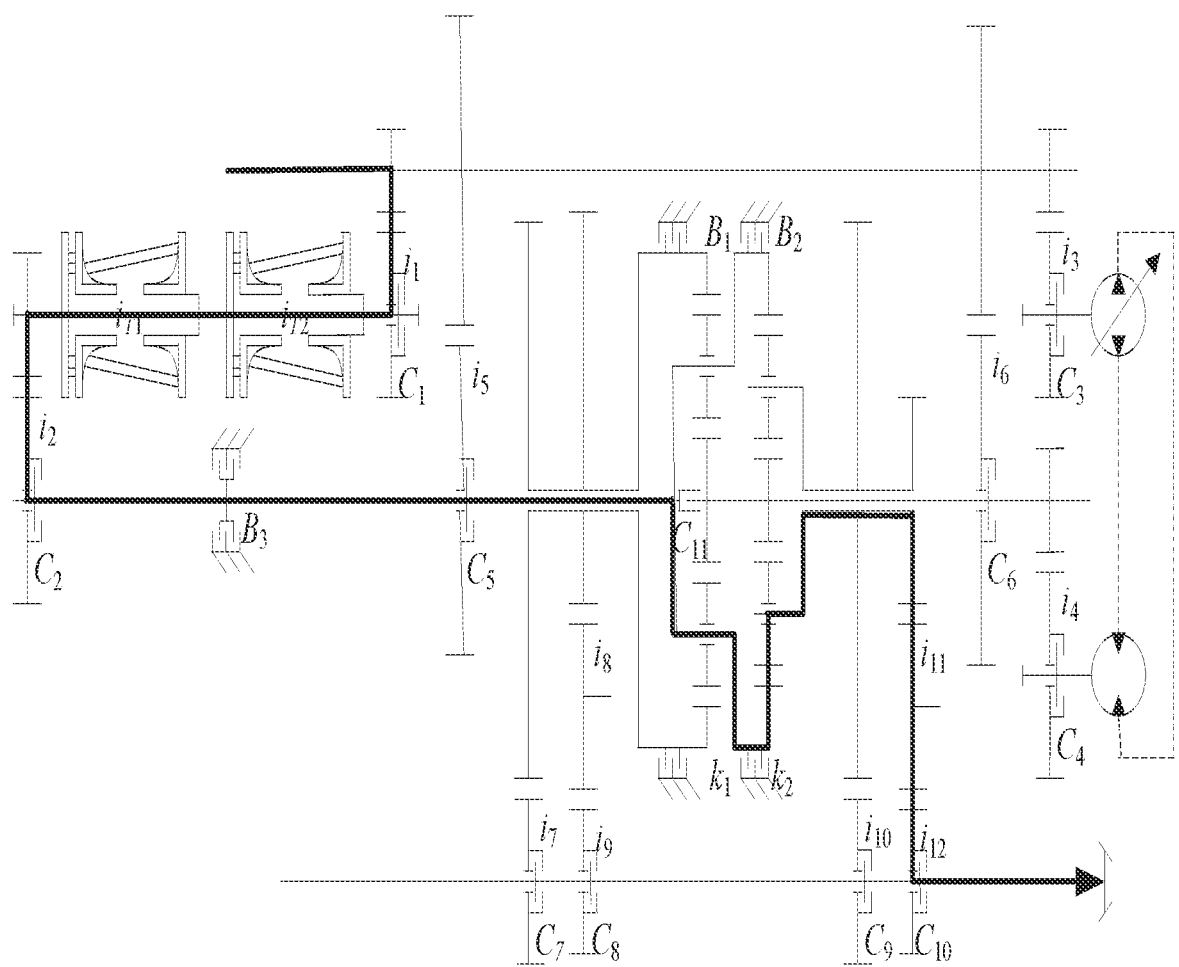
FIG. 5 is a schematic diagram showing the power flow in double ring transmission T2 according to the present disclosure.

The double ring transmission T2 is shown in FIG. 5, where only the first clutch $C_1$ 507, the second clutch $C_2$ 502, the tenth clutch $C_{10}$ 319, and the first brake $B_1$ 303 are engaged. The engine power transmitted by the input shaft 1 passes through the double ring input gear pair 508, the double ring input shaft 506, the first clutch $C_1$ 507, the double ring mechanism 504, the double ring output gear pair 501, and the second clutch $C_2$ 502 to drive the left planet carrier 304 of the convergence mechanism 3. Then, the power is transmitted through the right ring gear 307, the right planet carrier 309, the fourth convergence output gear pair 318, and the tenth clutch $C_{10}$ 319 to the output shaft 6 and is output from the output shaft 6.

Figure 6:
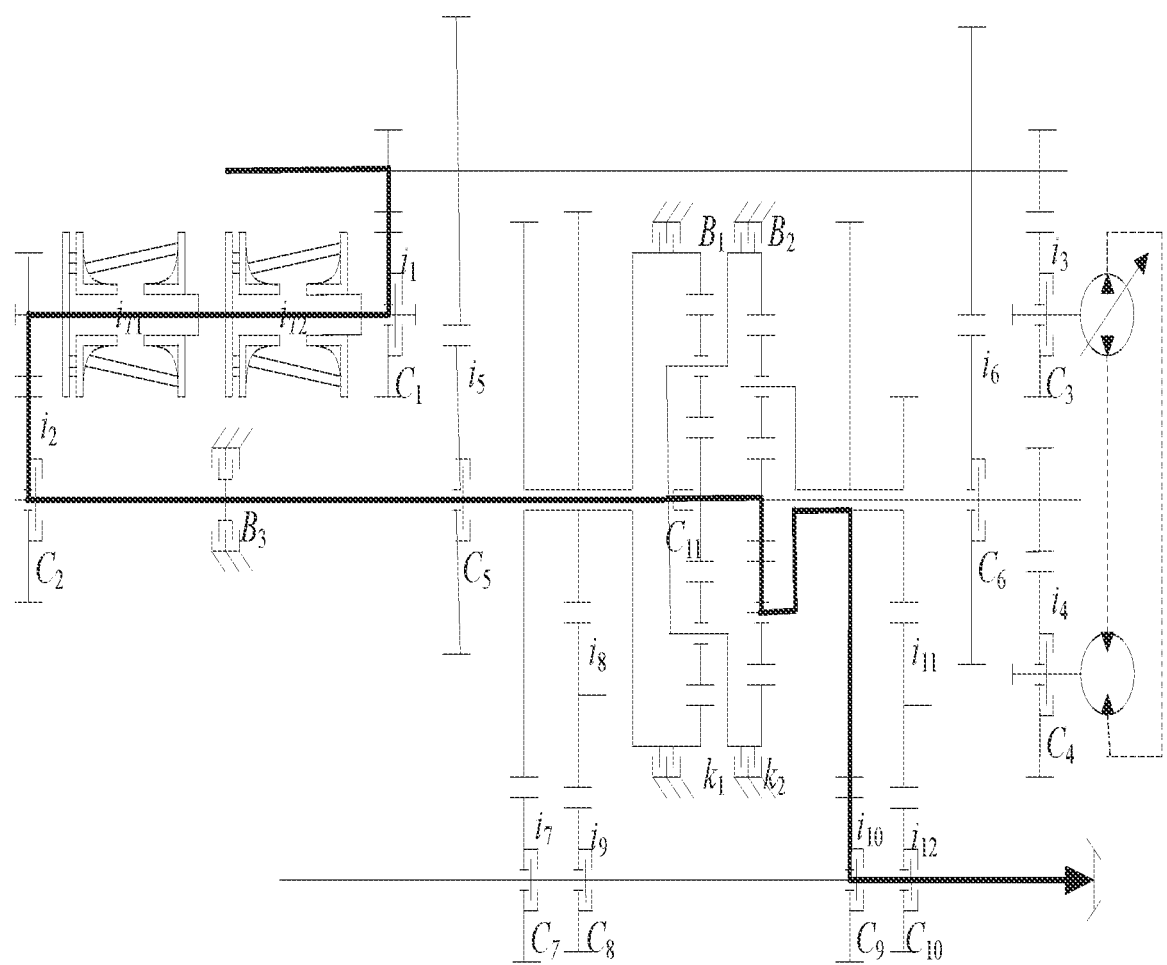
FIG. 6 is a schematic diagram showing the power flow in double ring transmission T3 according to the present disclosure.

The double ring transmission T3 is shown in FIG. 6, where only the first clutch $C_1$ 507, the second clutch $C_2$ 502, the ninth clutch $C_9$ 317, and the eleventh clutch $C_{11}$ 315 are engaged. The engine power transmitted by the input shaft 1 passes through the double ring input gear pair 508, the double ring input shaft 506, the first clutch $C_1$ 507, the double ring mechanism 504, the double ring output gear pair 501, and the second clutch $C_2$ 502 to drive the left planet carrier 304 of the convergence mechanism 3. Since the left and right planetary gears of the convergence mechanism 3 are fixedly connected as a whole, the power is transmitted through the convergence mechanism 3 to the third convergence output gear pair 316, then transmitted through the ninth clutch $C_9$ 317 to the output shaft 6, and finally output from the output shaft 6.

Figure 7:
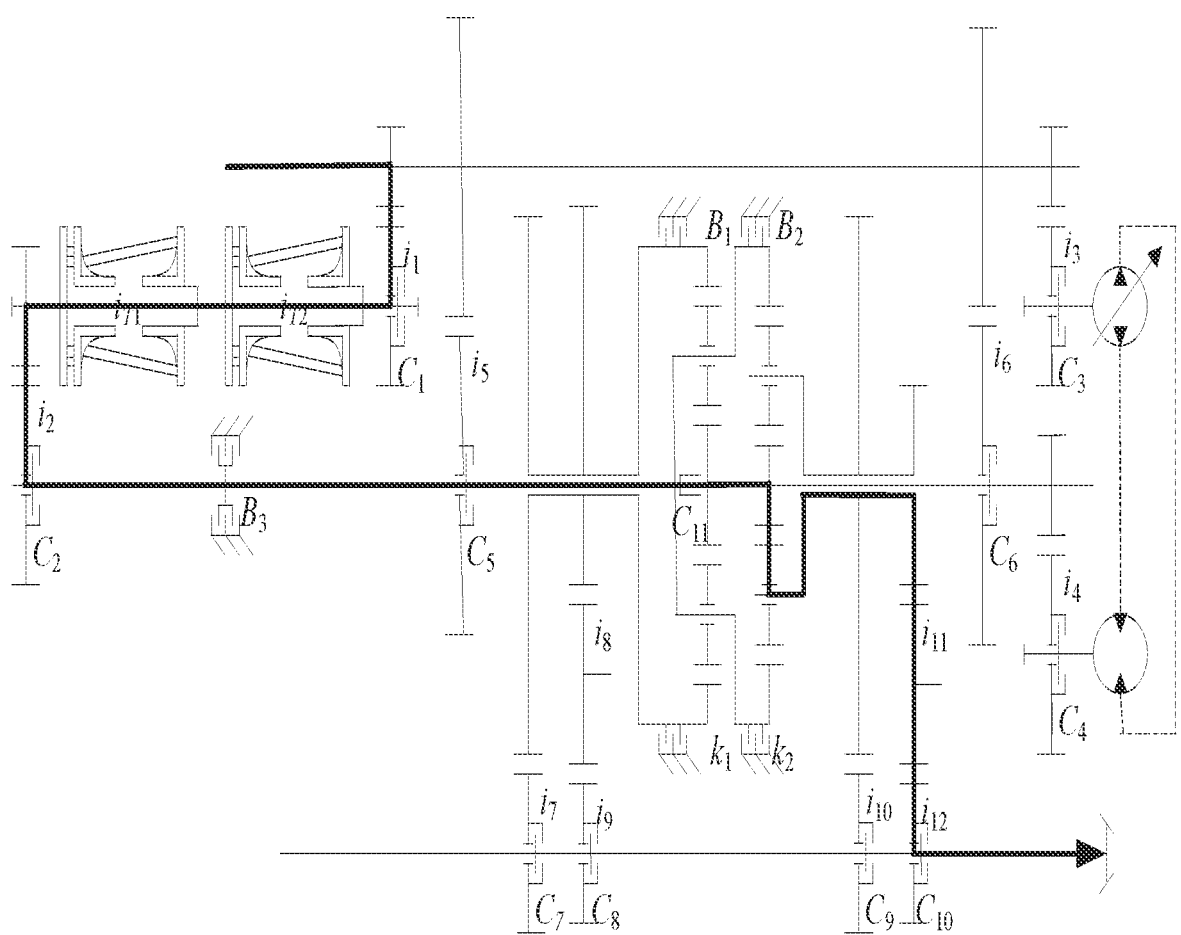
FIG. 7 is a schematic diagram showing the power flow in double ring transmission T4 according to the present disclosure.

The double ring transmission T4 is shown in FIG. 7, where only the first clutch $C_1$ 507, the second clutch $C_2$ 502, the tenth clutch $C_{10}$ 319, and the eleventh clutch $C_{11}$ 315 are engaged. The engine power transmitted by the input shaft 1 passes through the double ring input gear pair 508, the double ring input shaft 506, the first clutch $C_1$ 507, the double ring mechanism 504, the double ring output gear pair 501, and the second clutch $C_2$ 502 to drive the left planet carrier 304 of the convergence mechanism 3. Since the left and right planetary gears of the convergence mechanism 3 are fixedly connected as a whole, the power is transmitted through the convergence mechanism 3 to the fourth convergence output gear pair 318, then transmitted through the tenth clutch $C_{10}$ 319 to the output shaft 6, and finally output from the output shaft 6.

Figure 8:
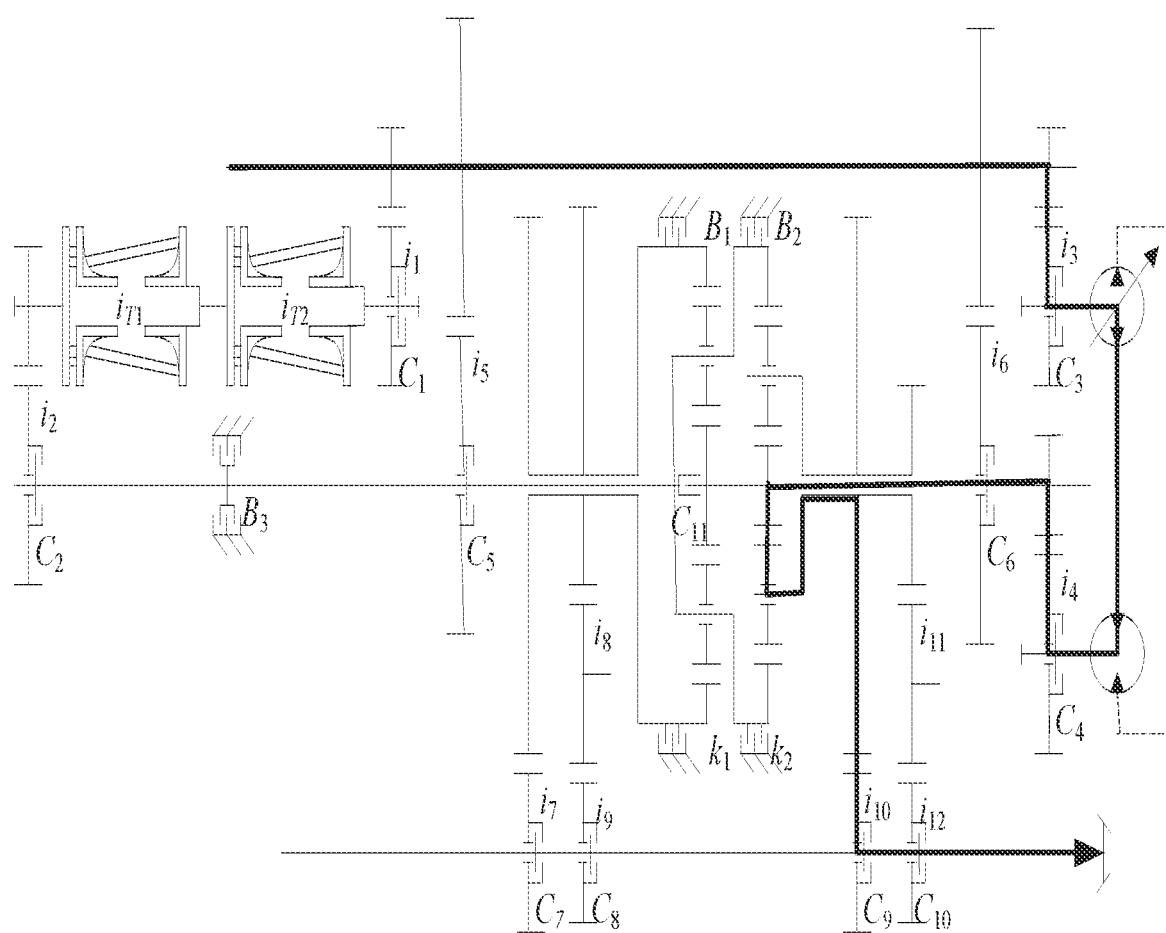
FIG. 8 is a schematic diagram showing the power flow in hydraulic transmission H1 according to the present disclosure.

The hydraulic transmission H1 is shown in FIG. 8, where only the third clutch $C_3$ 402, the fourth clutch $C_4$ 406, the ninth clutch $C_9$ 317, the second brake $B_2$ 306, and the third brake $B_3$ 505 are engaged. The engine power transmitted by the input shaft 1 passes through the hydraulic transmission input gear pair 401, the third clutch $C_3$ 402, the hydraulic transmission input shaft 403, the pump-controlled motor mechanism 404, the hydraulic transmission output shaft 407, the fourth clutch $C_4$ 406, and the hydraulic transmission output gear pair 405 to drive the right sun gear shaft 310. Then, the power passes through the right sun gear 308, the right planet carrier 309, the third convergence output gear pair 316, and the ninth clutch $C_9$ 317 of the convergence mechanism 3 to the output shaft 6 and is output from the output shaft 6.

Figure 9:
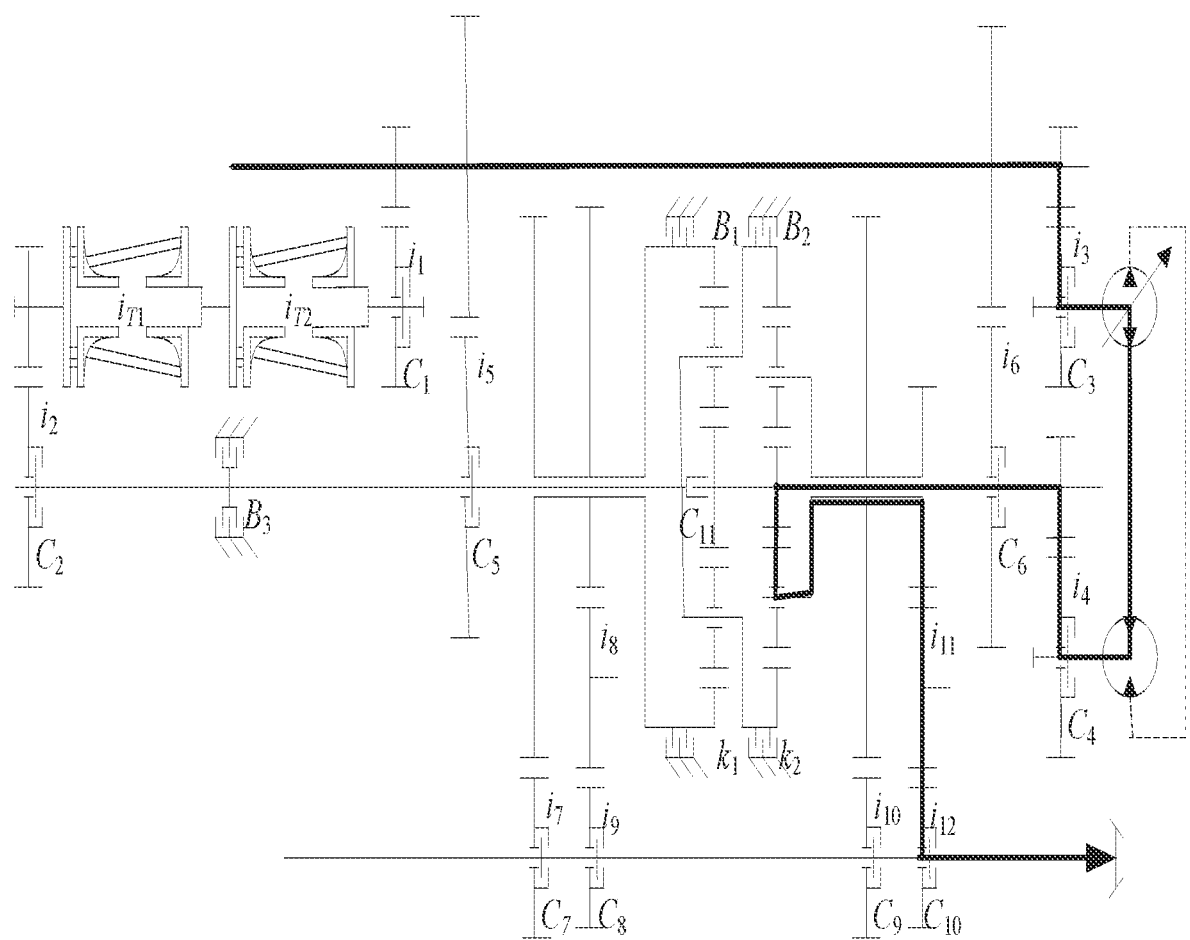
FIG. 9 is a schematic diagram showing the power flow in hydraulic transmission H2 according to the present disclosure.

The hydraulic transmission H2 is shown in FIG. 9, where only the third clutch $C_3$ 402, the fourth clutch $C_4$ 406, the tenth clutch $C_{10}$ 319, the second brake $B_2$ 306, and the third brake $B_3$ 505 are engaged. The engine power transmitted by the input shaft 1 passes through the hydraulic transmission input gear pair 401, the third clutch $C_3$ 402, the hydraulic transmission input shaft 403, the pump-controlled motor mechanism 404, the hydraulic transmission output shaft 407, the fourth clutch $C_4$ 406, and the hydraulic transmission output gear pair 405 to drive the right sun gear shaft 310. Then, the power passes through the right sun gear 308, the right planet carrier 309, the fourth convergence output gear pair 318, and the tenth clutch $C_{10}$ 319 of the convergence mechanism 3 to the output shaft 6 and is output from the output shaft 6.

Figure 10:
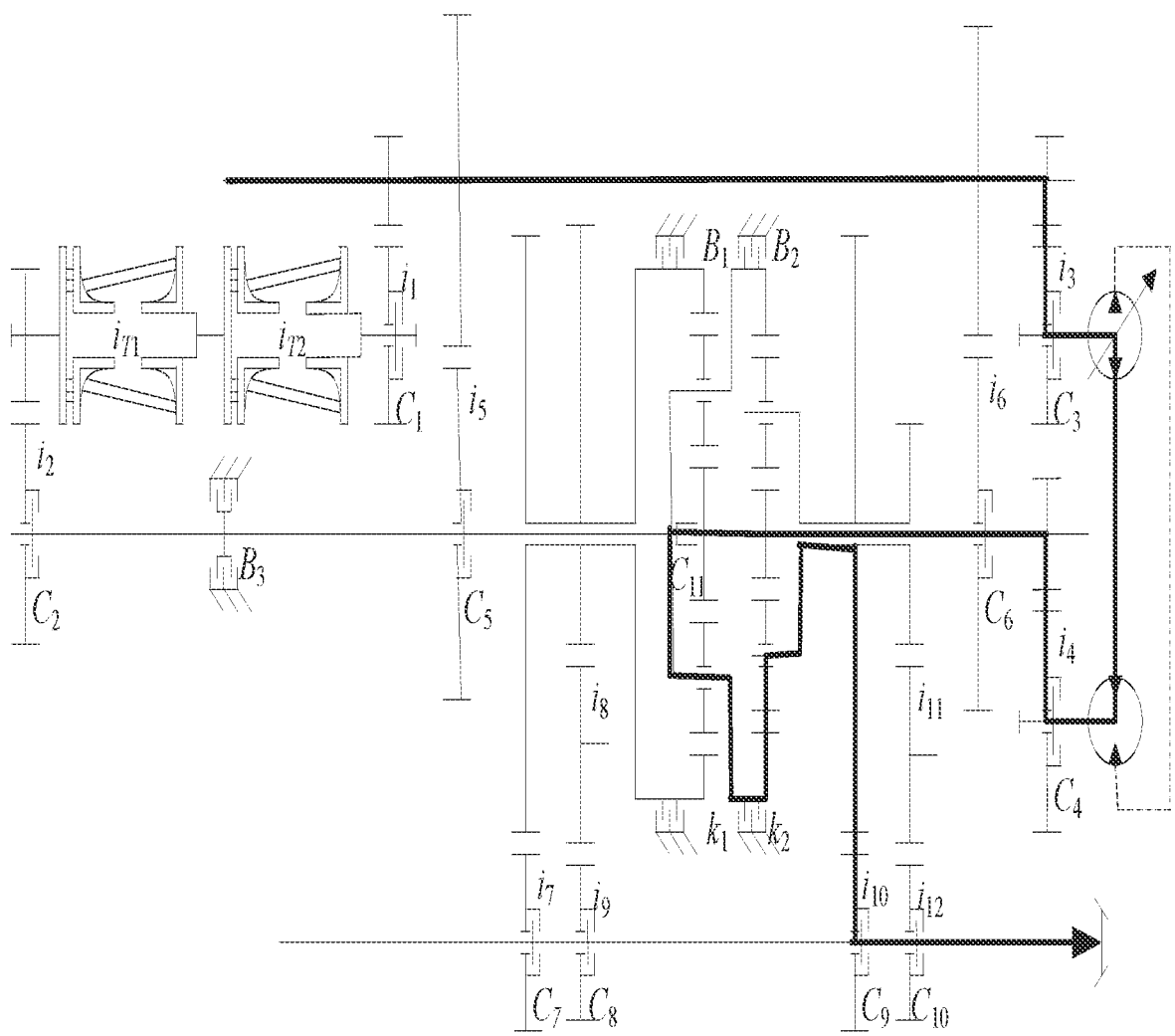
FIG. 10 is a schematic diagram showing the power flow in hydraulic transmission H3 according to the present disclosure.

The hydraulic transmission H3 is shown in FIG. 10, where only the third clutch $C_3$ 402, the fourth clutch $C_4$ 406, the ninth clutch $C_9$ 317, and the eleventh clutch $C_{11}$ 315 are engaged. The engine power transmitted by the input shaft 1 passes through the hydraulic transmission input gear pair 401, the third clutch $C_3$ 402, the hydraulic transmission input shaft 403, the pump-controlled motor mechanism 404, the hydraulic transmission output shaft 407, the fourth clutch $C_4$ 406, and the hydraulic transmission output gear pair 405 to drive the right sun gear shaft 310. Since the left and right planetary gears of the convergence mechanism 3 are fixedly connected as a whole, the power is transmitted through the convergence mechanism 3 to the third convergence output gear pair 316, then transmitted through the ninth clutch $C_9$ 317 to the output shaft 6, and finally output from the output shaft 6.

Figure 11:
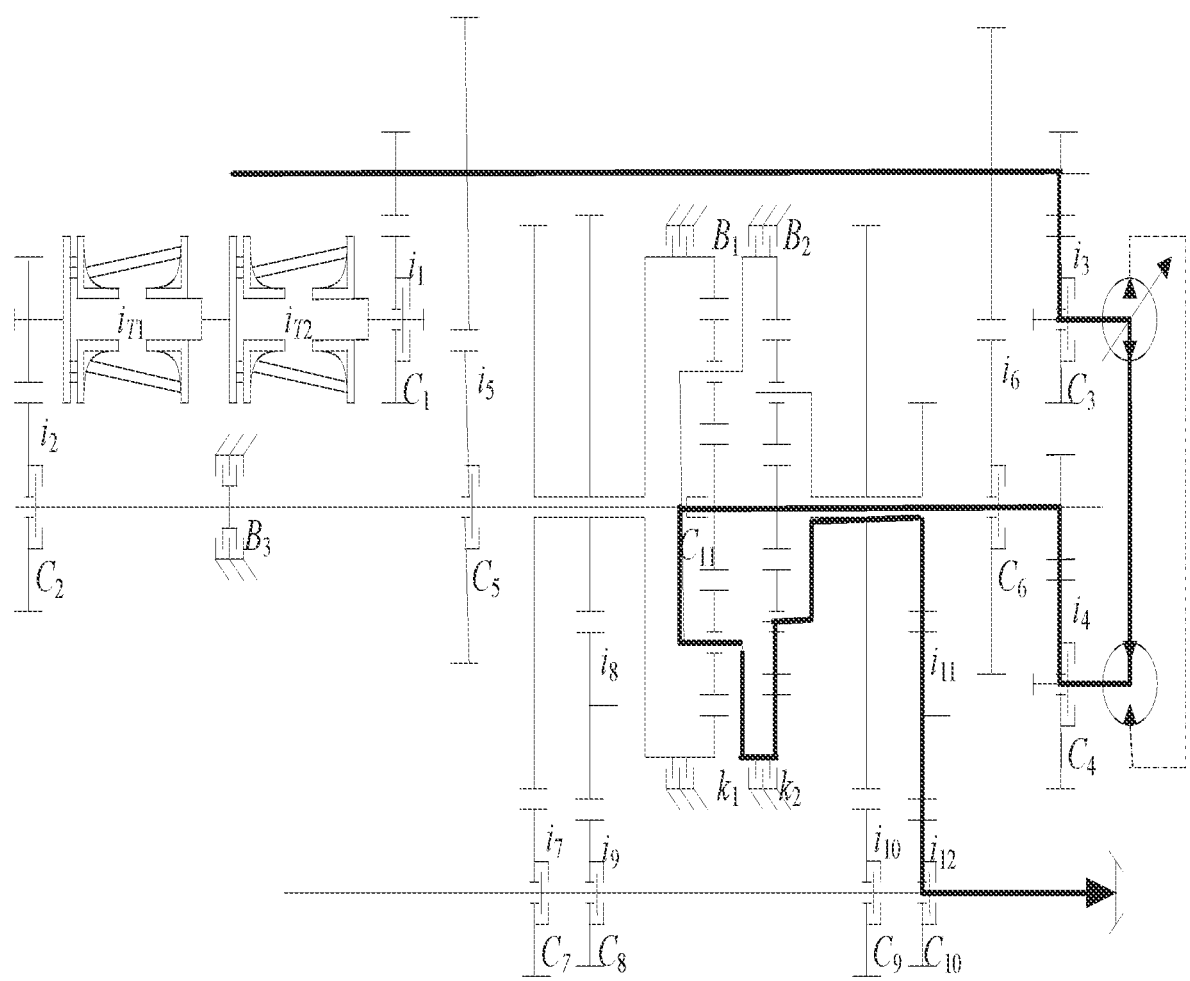
FIG. 11 is a schematic diagram showing the power flow in hydraulic transmission H4 according to the present disclosure.

The hydraulic transmission H4 is shown in FIG. 11, where only the third clutch $C_3$ 402, the fourth clutch $C_4$ 406, the tenth clutch $C_{10}$ 319, and the eleventh clutch $C_{11}$ 315 are engaged. The engine power transmitted by the input shaft 1 passes through the hydraulic transmission input gear pair 401, the third clutch $C_3$ 402, the hydraulic transmission input shaft 403, the pump-controlled motor mechanism 404, the hydraulic transmission output shaft 407, the fourth clutch $C_4$ 406, and the hydraulic transmission output gear pair 405 to drive the right sun gear shaft 310. Since the left and right planetary gears of the convergence mechanism 3 are fixedly connected as a whole, the power is transmitted through the convergence mechanism 3 to the fourth convergence output gear pair 318, then transmitted through the tenth clutch $C_{10}$ 319 to the output shaft 6, and finally output from the output shaft 6.

Figure 12:
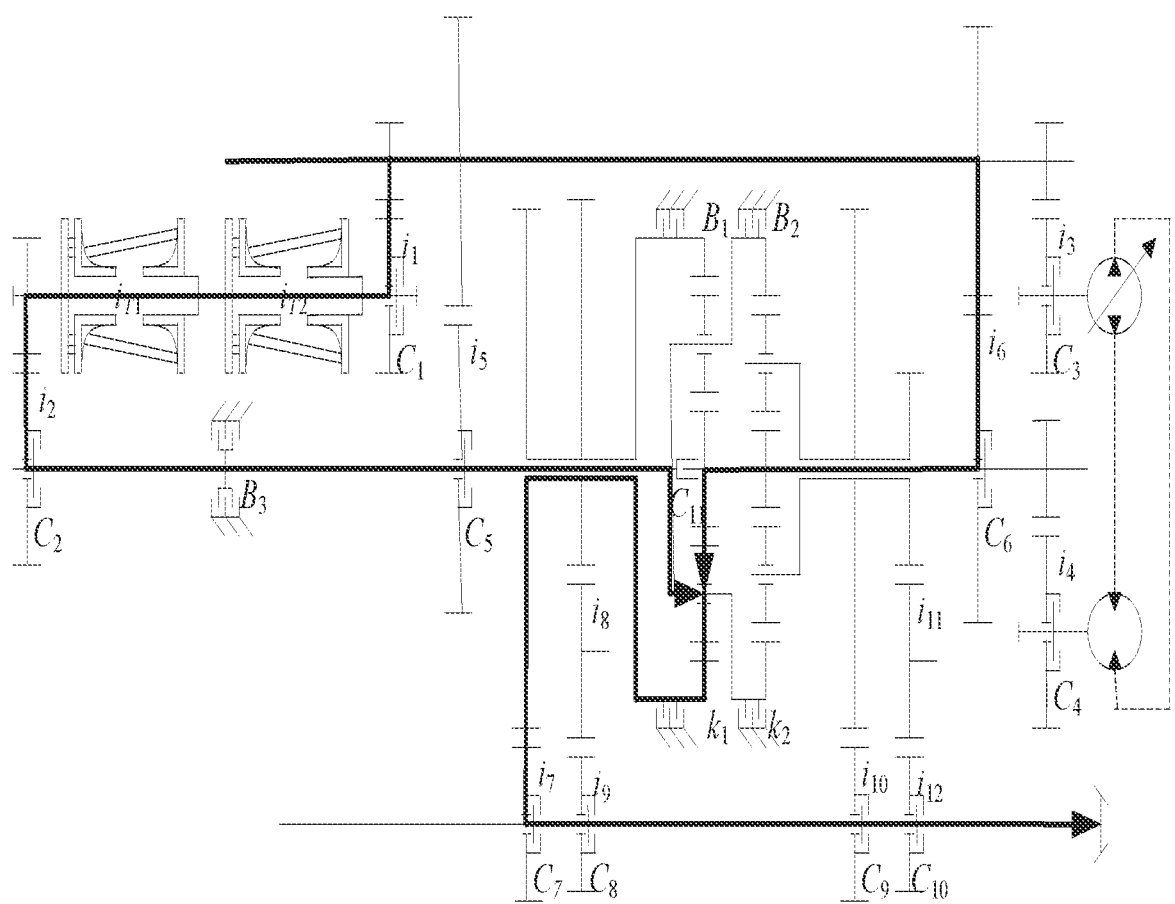
FIG. 12 is a schematic diagram showing the power flow in mechanical-double ring transmission MT1 according to the present disclosure.

The mechanical-double ring composite transmission MT1 is shown in FIG. 12, where only the first clutch $C_1$ 507, the second clutch $C_2$ 502, the sixth clutch $C_6$ 204, and the seventh clutch $C_7$ 311 are engaged. The engine power transmitted through the input shaft 1 is split into two parts. One part of the power passes through the double ring input gear pair 508, the double ring input shaft 506, the first clutch $C_1$ 507, the double ring mechanism 504, the double ring output gear pair 501, and the second clutch $C_2$ 502 to drive the left planet carrier 304 of the convergence mechanism 3. The other part of the power passes through the mechanical transmission right gear pair 203 and the sixth clutch $C_6$ 204 to drive the left sun gear 305. The two parts of the power are converged at the left ring gear 302, then transmitted through the first convergence output gear pair 312 and the seventh clutch $C_7$ 311 to the output shaft 6, and finally output from the output shaft 6.

Figure 13:
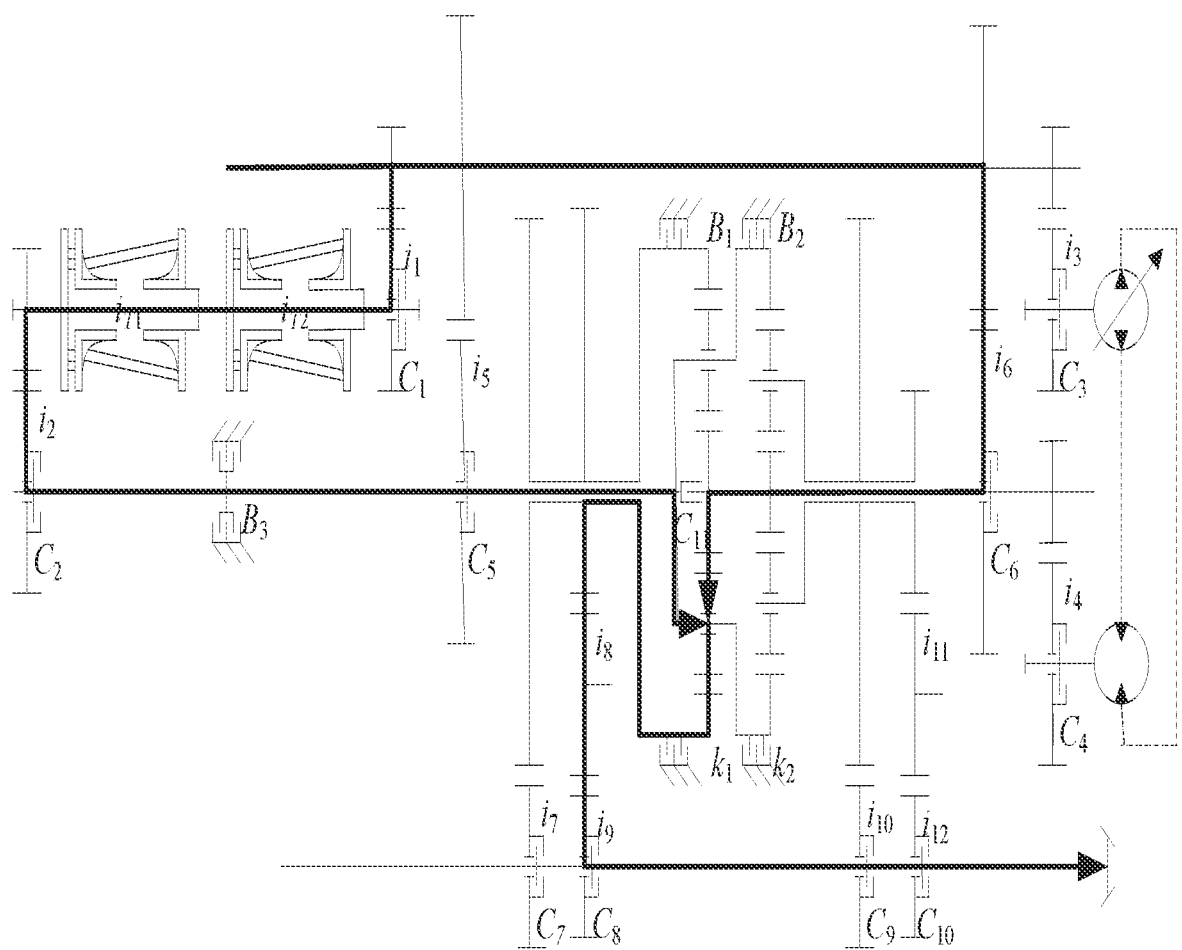
FIG. 13 is a schematic diagram showing the power flow in mechanical-double ring transmission MT2 according to the present disclosure.

The mechanical-double ring composite transmission MT2 is shown in FIG. 13, where only the first clutch $C_1$ 507, the second clutch $C_2$ 502, the sixth clutch $C_6$ 204, and the eighth clutch $C_8$ 313 are engaged. The engine power transmitted through the input shaft 1 is split into two parts. One part of the power passes through the double ring input gear pair 508, the double ring input shaft 506, the first clutch $C_1$ 507, the double ring mechanism 504, the double ring output gear pair 501, and the second clutch $C_2$ 502 to drive the left planet carrier 304 of the convergence mechanism 3. The other part of the power passes through the mechanical transmission right gear pair 203 and the sixth clutch $C_6$ 204 to drive the left sun gear 305. The two parts of the power are converged at the left ring gear 302, then transmitted through the second convergence output gear pair 314 and the eighth clutch $C_8$ 313 to the output shaft 6, and finally output from the output shaft 6.

Figure 14:
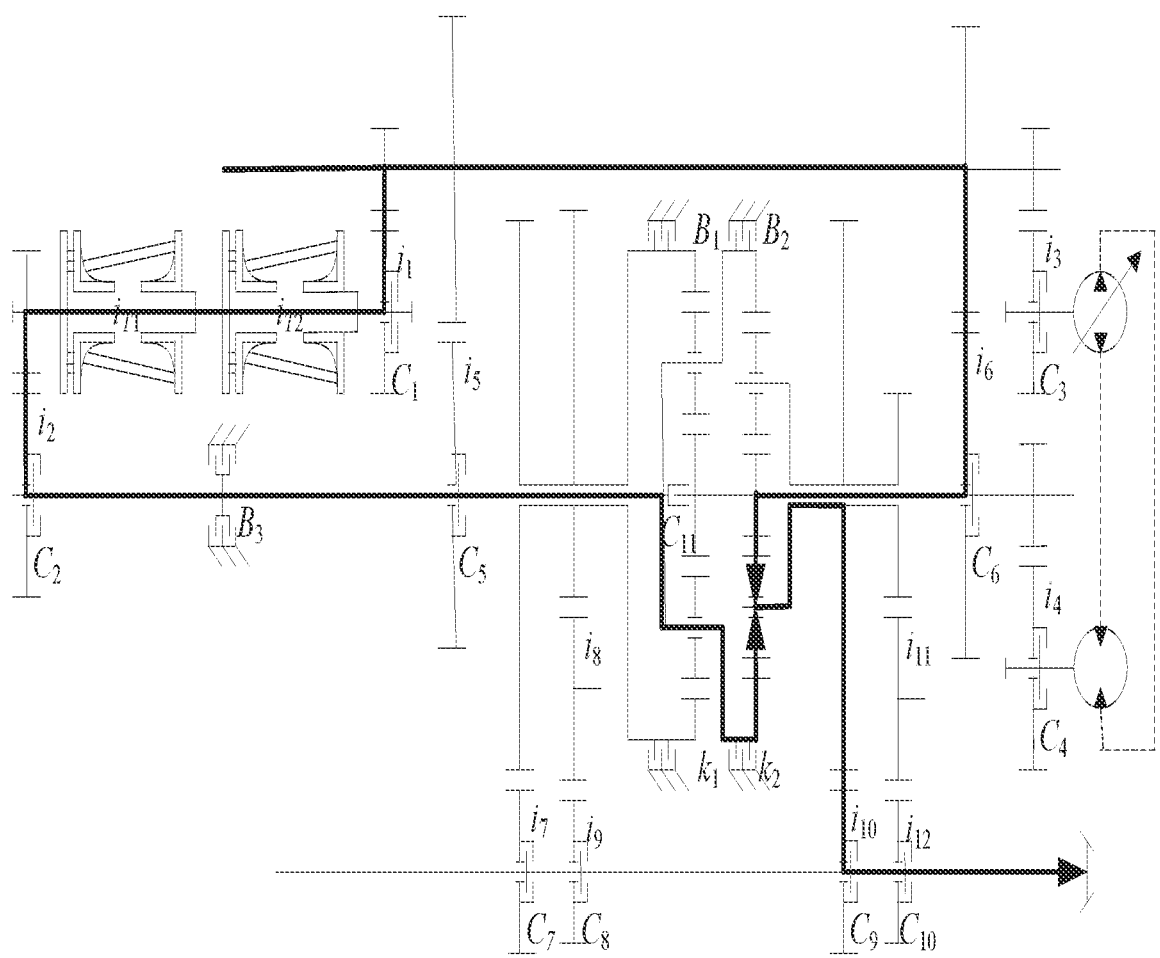
FIG. 14 is a schematic diagram showing the power flow in mechanical-double ring transmission MT3 according to the present disclosure.

The mechanical-double ring composite transmission MT3 is shown in FIG. 14, where only the first clutch $C_1$ 507, the second clutch $C_2$ 502, the sixth clutch $C_6$ 204, and the ninth clutch $C_9$ 317 are engaged. The engine power transmitted through the input shaft 1 is split into two parts. One part of the power passes through the double ring input gear pair 508, the double ring input shaft 506, the first clutch $C_1$ 507, the double ring mechanism 504, the double ring output gear pair 501, and the second clutch $C_2$ 502 to drive the left planet carrier 304 of the convergence mechanism 3. The other part of the power passes through the mechanical transmission right gear pair 203 and the sixth clutch $C_6$ 204 to drive the right sun gear 308. The two parts of the power are converged at the right planet carrier 309, then transmitted through the third convergence output gear pair 316 and the ninth clutch $C_9$ 317 to the output shaft 6, and finally output from the output shaft 6.

Figure 15:
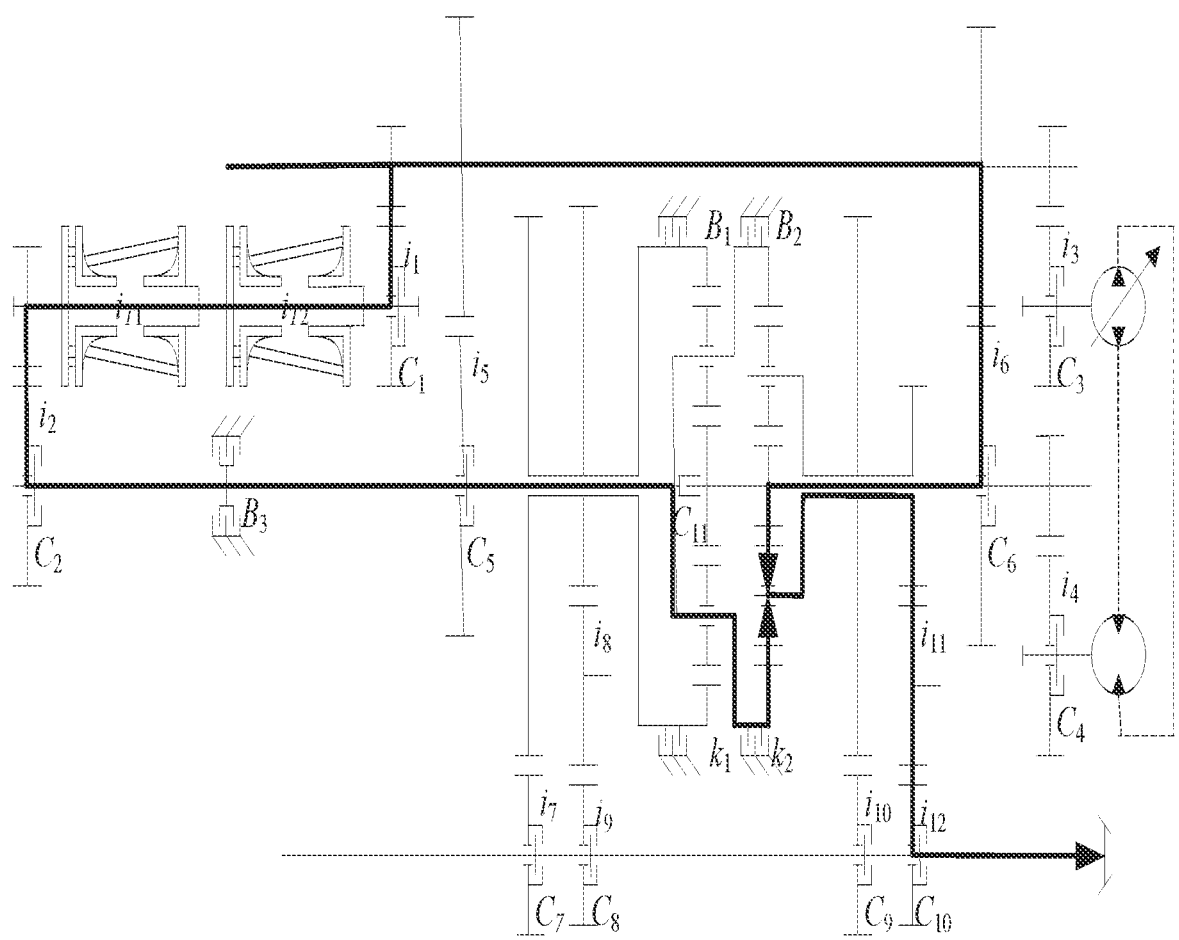
FIG. 15 is a schematic diagram showing the power flow in mechanical-double ring transmission MT4 according to the present disclosure.

The mechanical-double ring composite transmission MT4 is shown in FIG. 15, where only the first clutch $C_1$ 507, the second clutch $C_2$ 502, the sixth clutch $C_6$ 204, and the tenth clutch $C_{10}$ 319 are engaged. The engine power transmitted through the input shaft 1 is split into two parts. One part of the power passes through the double ring input gear pair 508, the double ring input shaft 506, the first clutch $C_1$ 507, the double ring mechanism 504, the double ring output gear pair 501, and the second clutch $C_2$ 502 to drive the left planet carrier 304 of the convergence mechanism 3. The other part of the power passes through the mechanical transmission right gear pair 203 and the sixth clutch $C_6$ 204 to drive the right sun gear 308. The two parts of the power are converged at the right planet carrier 309, then transmitted through the fourth convergence output gear pair 318 and the tenth clutch $C_{10}$ 319 to the output shaft 6, and finally output from the output shaft 6.

Figure 16:
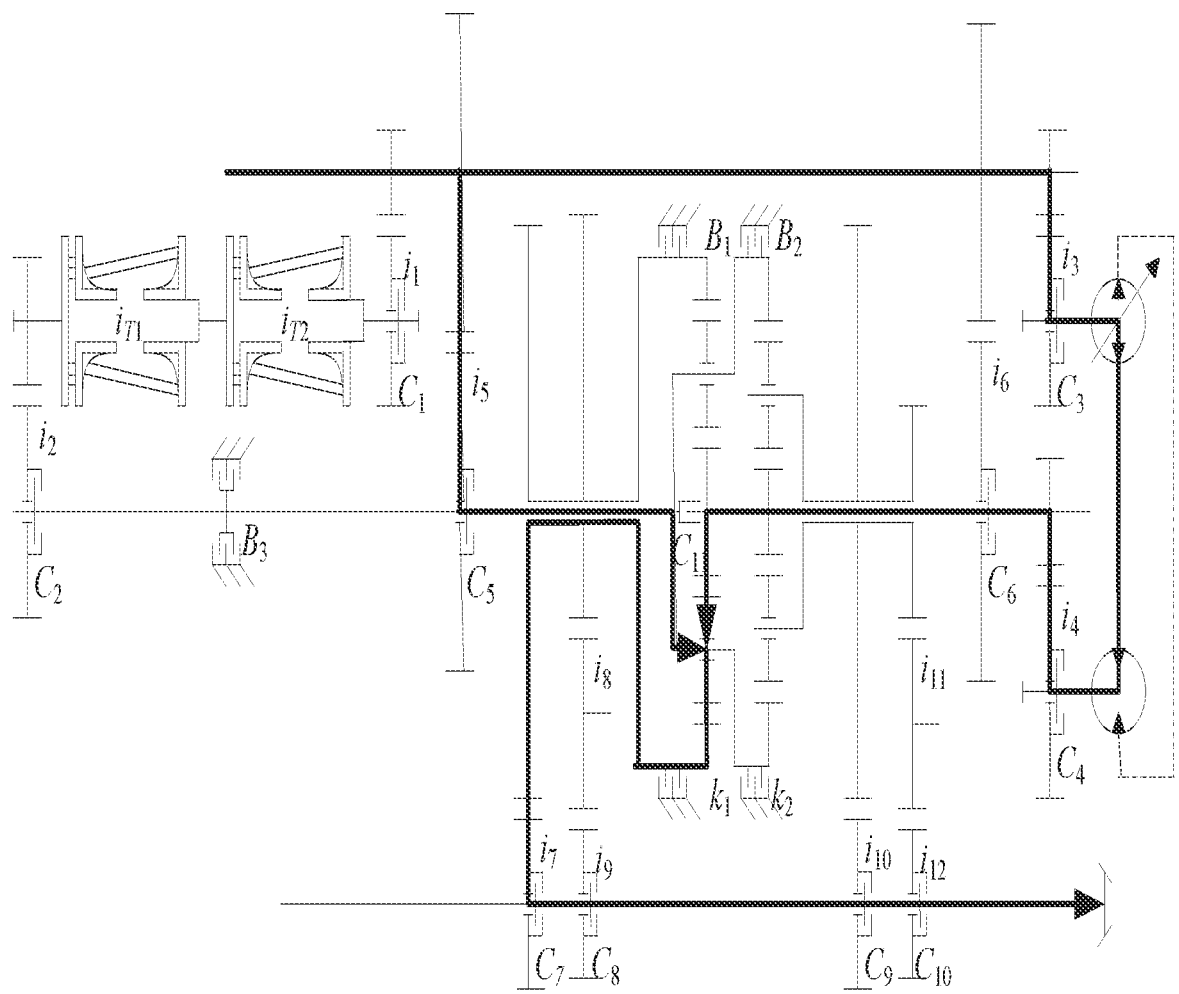
FIG. 16 is a schematic diagram showing the power flow in mechanical-hydraulic transmission MH1 according to the present disclosure.

The mechanical-hydraulic composite transmission MH1 is shown in FIG. 16, where only the third clutch $C_3$ 402, the fourth clutch $C_4$ 406, the fifth clutch $C_5$ 202, and the seventh clutch $C_7$ 311 are engaged. The engine power transmitted through the input shaft 1 is split into two parts. One part of the power passes through the hydraulic transmission input gear pair 401, the third clutch $C_3$ 402, the hydraulic transmission input shaft 403, the pump-controlled motor mechanism 404, the hydraulic transmission output shaft 407, the fourth clutch $C_4$ 406, the hydraulic transmission output gear pair 405, the right sun gear shaft 310, and the right sun gear 308 to drive the left sun gear 305. The other part of the power passes through the mechanical transmission left gear pair 203 and the fifth clutch $C_5$ 202 to drive the left planet carrier 304. The two parts of the power are converged at the left ring gear 302, then transmitted through the first convergence output gear pair 312 and the seventh clutch $C_7$ 311 to the output shaft 6, and finally output from the output shaft 6.

Figure 17:
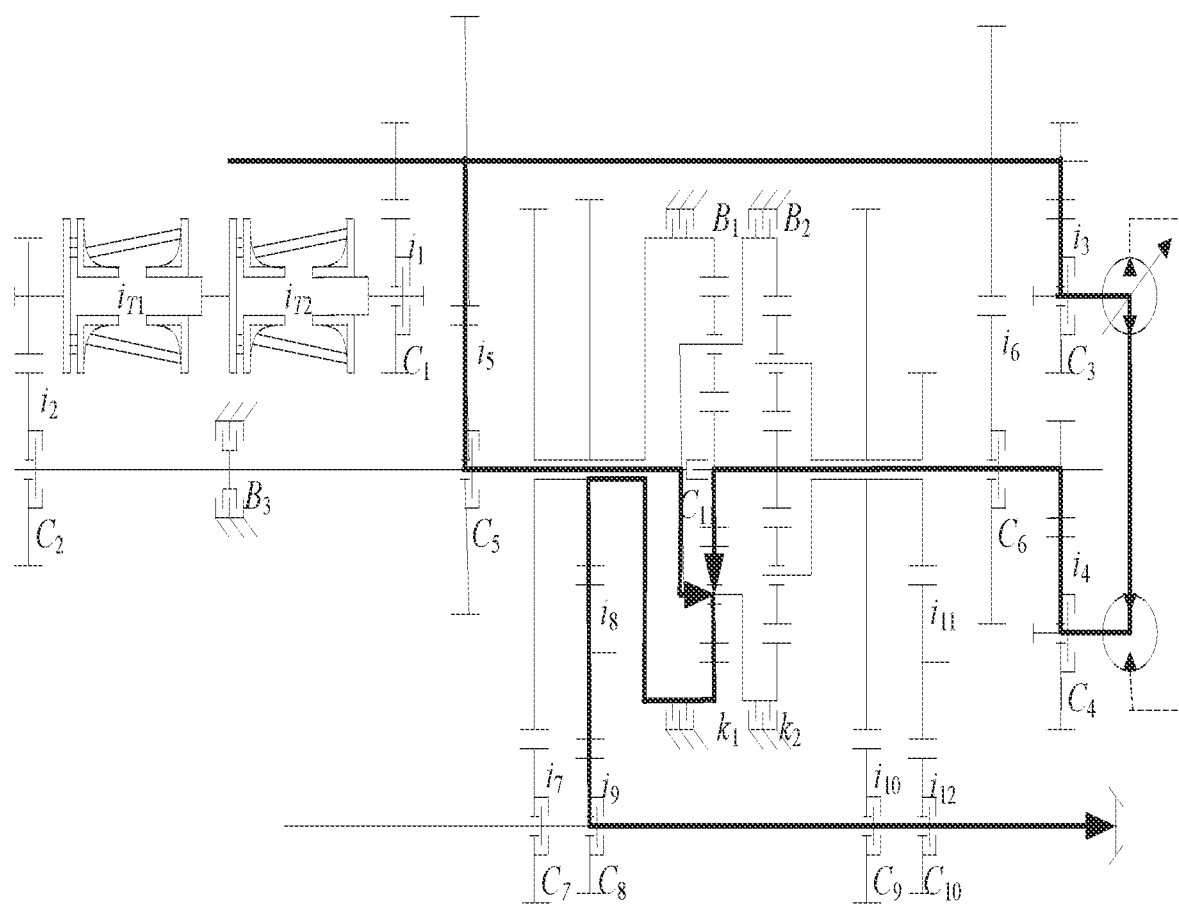
FIG. 17 is a schematic diagram showing the power flow in mechanical-hydraulic transmission MH2 according to the present disclosure.

The mechanical-hydraulic composite transmission MH2 is shown in FIG. 17, where only the third clutch $C_3$ 402, the fourth clutch $C_4$ 406, the fifth clutch $C_5$ 202, and the eighth clutch $C_8$ 313 are engaged. The engine power transmitted through the input shaft 1 is split into two parts. One part of the power passes through the hydraulic transmission input gear pair 401, the third clutch $C_3$ 402, the hydraulic transmission input shaft 403, the pump-controlled motor mechanism 404, the hydraulic transmission output shaft 407, the fourth clutch $C_4$ 406, the hydraulic transmission output gear pair 405, the right sun gear shaft 310, and the right sun gear 308 to drive the left sun gear 305. The other part of the power passes through the mechanical transmission left gear pair 203 and the fifth clutch $C_5$ 202 to drive the left planet carrier 304. The two parts of the power are converged at the left ring gear 302, then transmitted through the second convergence output gear pair 314 and the eighth clutch $C_8$ 313 to the output shaft 6, and finally output from the output shaft 6.

Figure 18:
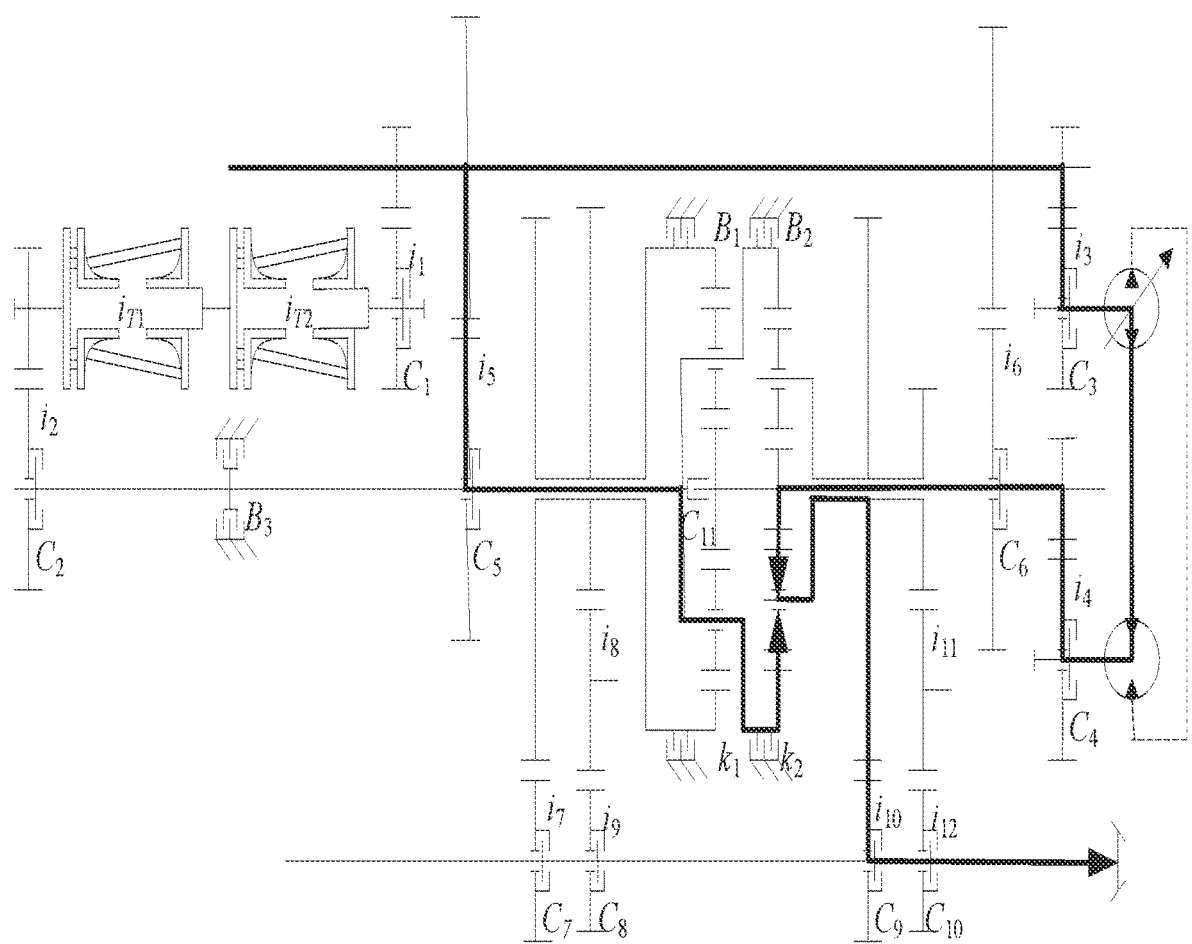
FIG. 18 is a schematic diagram showing the power flow in mechanical-hydraulic transmission MH3 according to the present disclosure.

The mechanical-hydraulic composite transmission MH3 is shown in FIG. 18, where only the third clutch $C_3$ 402, the fourth clutch $C_4$ 406, the fifth clutch $C_5$ 202, and the ninth clutch $C_9$ 317 are engaged. The engine power transmitted through the input shaft 1 is split into two parts. One part of the power passes through the hydraulic transmission input gear pair 401, the third clutch $C_3$ 402, the hydraulic transmission input shaft 403, the pump-controlled motor mechanism 404, the hydraulic transmission output shaft 407, the fourth clutch $C_4$ 406, the hydraulic transmission output gear pair 405, and the right sun gear shaft 310 to drive the right sun gear 308. The other part of the power passes through the mechanical transmission left gear pair 203, the fifth clutch $C_5$ 202, and the left planet carrier 304 to drive the right ring gear 307. The two parts of the power are converged at the right planet carrier 309, then transmitted through the third convergence output gear pair 316 and the ninth clutch $C_9$ 317 to the output shaft 6, and finally output from the output shaft 6.

Figure 19:
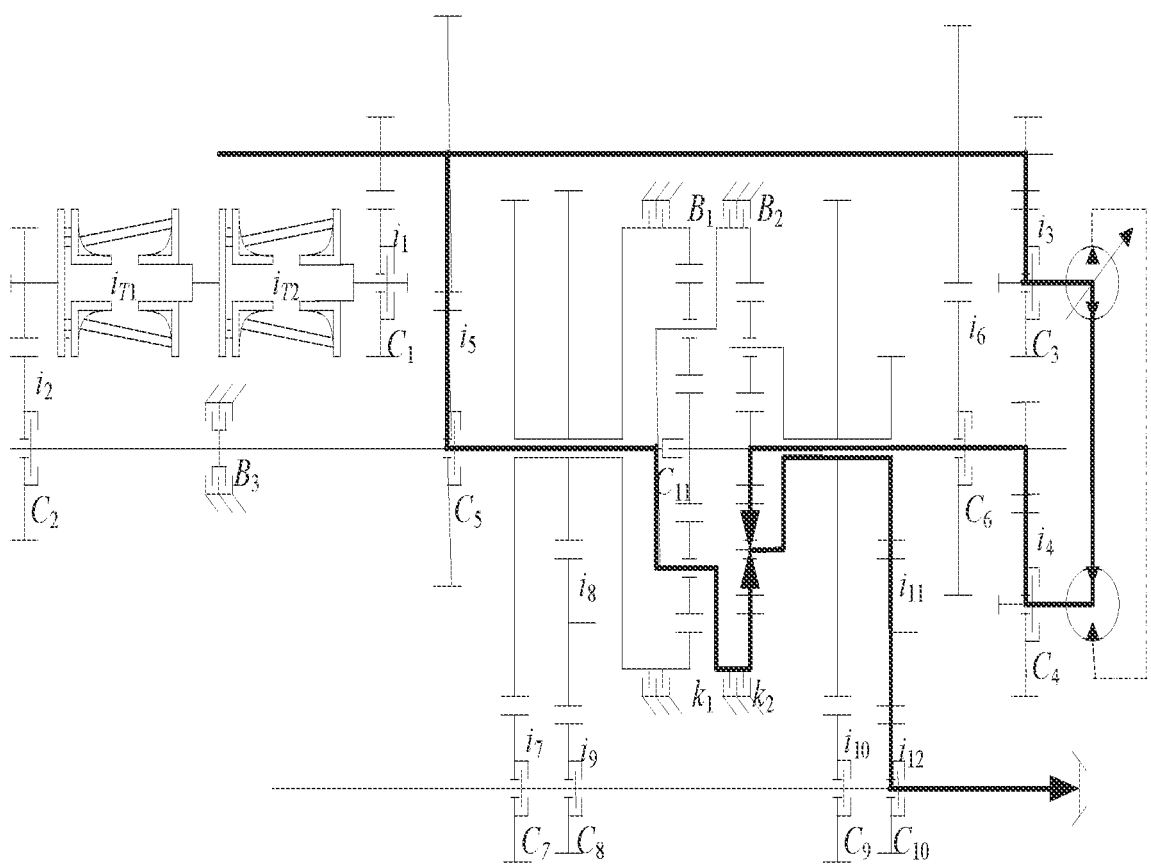
FIG. 19 is a schematic diagram showing the power flow in mechanical-hydraulic transmission MH4 according to the present disclosure.

The mechanical-hydraulic composite transmission MH4 is shown in FIG. 19, where only the third clutch $C_3$ 402, the fourth clutch $C_4$ 406, the fifth clutch $C_5$ 202, and the tenth clutch $C_{10}$ 319 are engaged. The engine power transmitted through the input shaft 1 is split into two parts. One part of the power passes through the hydraulic transmission input gear pair 401, the third clutch $C_3$ 402, the hydraulic transmission input shaft 403, the pump-controlled motor mechanism 404, the hydraulic transmission output shaft 407, the fourth clutch $C_4$ 406, the hydraulic transmission output gear pair 405, and the right sun gear shaft 310 to drive the right sun gear 308. The other part of the power passes through the mechanical transmission left gear pair 203, the fifth clutch $C_5$ 202, and the left planet carrier 304 to drive the right ring gear 307. The two parts of the power are converged at the right planet carrier 309, then transmitted through the fourth convergence output gear pair 318 and the tenth clutch $C_{10}$ 319 to the output shaft 6, and finally output from the output shaft 6.

Figure 20:
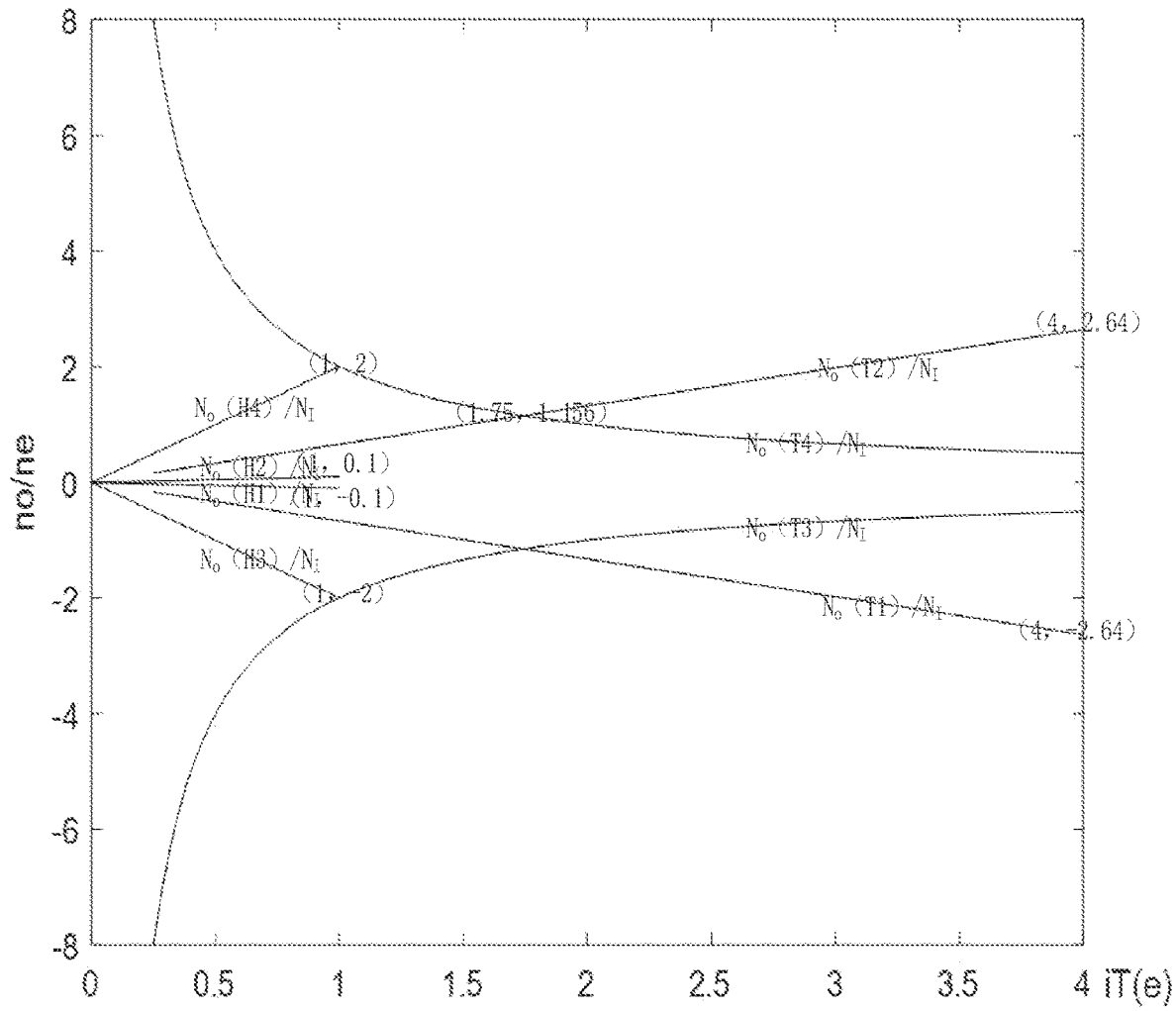
FIG. 20 is a diagram showing output speed and input speed relationships during single-flow transmissions according to the present disclosure.

As shown in FIG. 20, by adjusting the transmission ratio of the double ring mechanism 5, adjusting the displacement ratio of the hydraulic transmission mechanism 4, and selectively controlling engagement of the clutch assembly, H4 is adopted for forward startup, the output speed increases linearly with the increase of the displacement ratio e of the hydraulic transmission mechanism, and when e=1, the hydraulic transmission H4 reaches a positive maximum value. When e·$i_T$∈[$n_o$(H4)=$n_o$(T4)], e∈[0, 1], and $i_T$ falls in a determined transmission ratio range, the hydraulic transmission H4 can be synchronously switched to the double ring transmission T4, and when the transmission ratio $i_T$ of the double ring transmission mechanism changes from a maximum value to a minimum value, $n_o$(T4) increases nonlinearly. When the double ring transmission T2 is adopted for forward movement, the output speed increases linearly with the increase of the transmission ratio $i_T$ of the double ring transmission mechanism, and when $i_T$=4, the double ring transmission T2 reaches a positive maximum value. When e·$i_T$∈[$n_o$(T4)=$n_o$(T2)] and it falls in a determined transmission ratio range, the double ring transmission T2 can be synchronously switched to the double ring transmission T4, and when the transmission ratio $i_T$ of the double ring transmission mechanism changes from the maximum value to the minimum value, $n_o$(T4) increases nonlinearly. When H3 is adopted for reverse startup, the output speed increases linearly with the increase of the displacement ratio e of the hydraulic transmission mechanism, and when e=1, the hydraulic transmission H3 reaches a negative maximum value. When e·$i_T$∈[$n_o$(H3)=$n_o$(T3)], e∈[0, 1], and $i_T$ falls in a determined transmission ratio range, the hydraulic transmission H3 can be synchronously switched to the double ring transmission T3, and when the transmission ratio $i_T$ of the double ring transmission mechanism changes from the maximum value to the minimum value, $n_o$(T3) increases nonlinearly. When the double ring transmission T1 is adopted for reverse movement, the output speed increases linearly with the increase of the transmission ratio $i_T$ of the double ring transmission mechanism, and when $i_T$=4, the double ring transmission T1 reaches a negative maximum value. When e·$i_T$∈[$n_o$(T3)=$n_o$(T1)] and it falls in a determined transmission ratio range, the double ring transmission T1 can be synchronously switched to the double ring transmission T3, and when the transmission ratio $i_T$ of the double ring transmission mechanism changes from the maximum value to the minimum value, $n_o$(T3) increases nonlinearly.

Figure 21:
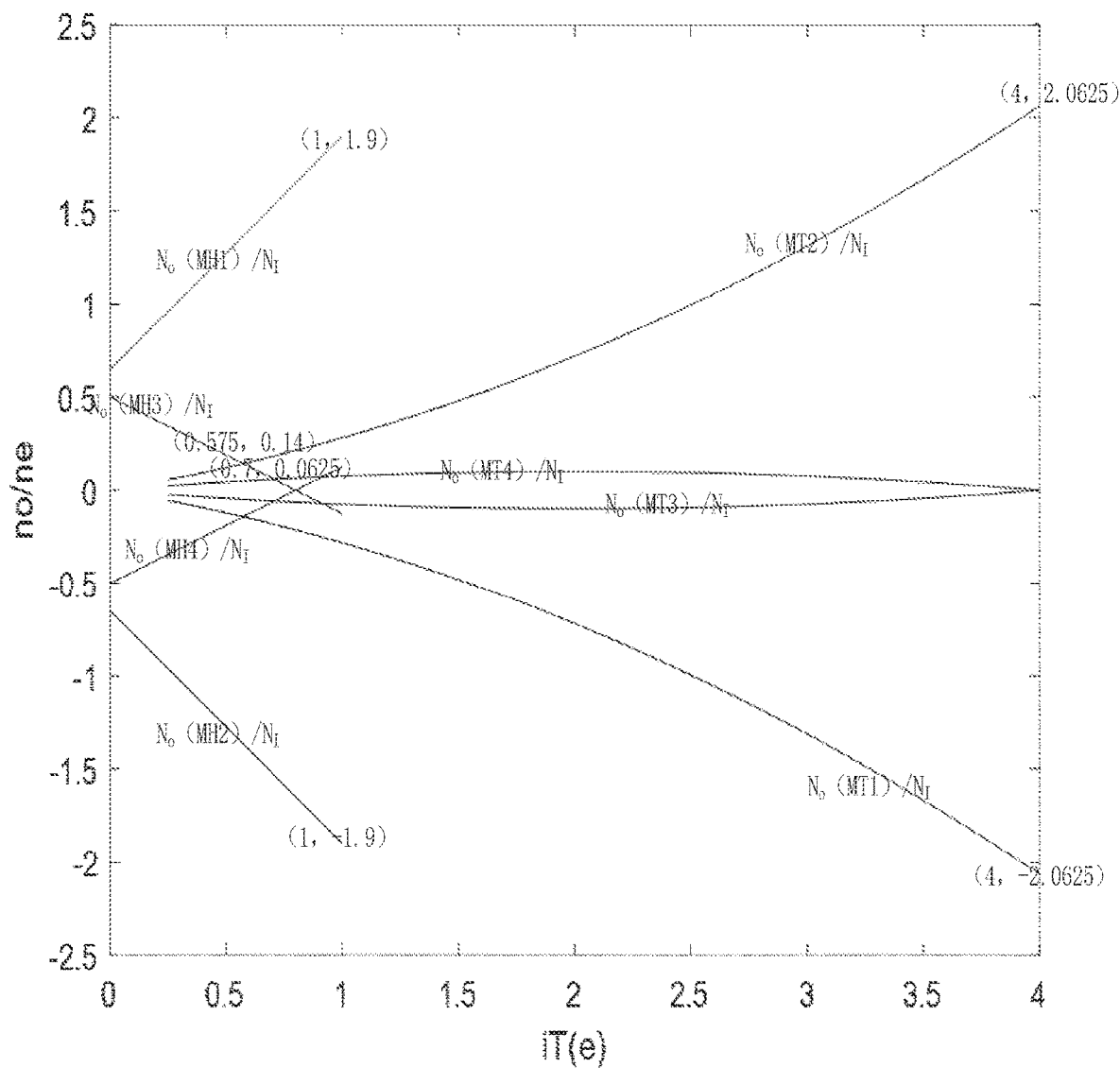
FIG. 21 is a diagram showing output speed and input speed relationships during composite transmissions according to the present disclosure.

As shown in FIG. 21, by adjusting the transmission ratio of the double ring mechanism 5, adjusting the displacement ratio of the hydraulic transmission mechanism 4, and selectively controlling engagement of the clutch assembly, the mechanical-hydraulic composite transmission MH1 is adopted for forward movement, the output speed increases linearly with the increase of the displacement ratio e of the hydraulic transmission mechanism, and when e=1, the mechanical-hydraulic composite transmission MH1 reaches a positive maximum value. When the mechanical-double ring composite transmission MT2 is adopted for forward movement, the output speed increases nonlinearly with the increase of it. When e·$i_T$∈[$n_o$(MT2)=$n_o$(MH3)], e∈[0, 1], and it falls in a determined transmission ratio range, the mechanical-double ring composite transmission MT2 can be synchronously switched to the mechanical-hydraulic composite transmission MH3, and when the displacement ratio e of the hydraulic transmission mechanism changes from a maximum value to a minimum value, $n_o$(MH3) increases linearly. When e·$i_T$∈[$n_o$(MT4)=$n_o$(MH3)], e∈[0, 1], and it falls in a determined transmission ratio range, the mechanical-hydraulic composite transmission MH3 can be synchronously switched to the mechanical-double ring composite transmission MT4, and the output speed decreases nonlinearly with the increase of the transmission ratio $i_T$ of the double ring transmission mechanism. When the mechanical-hydraulic composite transmission MH2 is adopted for reverse movement, the output speed increases linearly with the increase of the displacement ratio e of the hydraulic transmission mechanism, and when e=1, the mechanical-hydraulic composite transmission MH2 reaches a negative maximum value. When the mechanical-double ring composite transmission MT1 is adopted for reverse movement, the output speed increases nonlinearly with the increase of $i_T$. When e·$i_T$∈[$n_o$(MT1)=$n_o$(MH4)], e∈[0, 1], and $i_T$ falls in a determined transmission ratio range, the mechanical-double ring composite transmission MT1 can be synchronously switched to the mechanical-hydraulic composite transmission MH4, and when the displacement ratio e of the hydraulic transmission mechanism changes from the maximum value to the minimum value, $n_o$(MH4) increases linearly. When e·$i_T$∈[$n_o$(MT3)=$n_o$(MH4)], e∈[0, 1], and $i_T$ falls in a determined transmission ratio range, the mechanical-hydraulic composite transmission MH4 can be synchronously switched to the mechanical-double ring composite transmission MT3, and the output speed decreases nonlinearly with the increase of the transmission ratio $i_T$ of the double ring transmission mechanism.

An embodiment is given below for illustration.

The main parameters are: $i_1i_2$=0.5, $i_3i_4$=0.5, $i_5$=2.5, $i_6$=0.5, $i_7$=1, $i_8i_9$=1, $i_{10}$=1, $i_{11}i_{12}$=1, $k_1$=1.6, $k_2$=4, $i_{T1}$∈[0.5, 2], $i_{T2}$∈[0.5, 2], $i_T$=$i_{T1}i_{T2}$∈[0.25, 4].

The output-input speed relationship in the mechanical transmission M1 is $$n_o(M1) = \frac{1}{i_5 i_7} n_I = 0.4 n_I;$$

the output-input speed relationship in the mechanical transmission M2 is $$n_o(M2) = -\frac{1}{i_5 i_8 i_9} n_I = -0.4 n_I;$$

the output-input speed relationship in the double ring transmission T1 is:

$$n_o(T1) = -\frac{1+k_1+k_2}{(1+k_2)i_1 i_2 i_{10} i_{T_1} i_{T_2}} n_I = -\frac{6.6}{2.5 i_{T_1} i_{T_2}} n_I;$$

the output-input speed relationship in the double ring transmission T2 is:

$$n_o(T2) = \frac{1+k_1+k_2}{(1+k_2)i_1 i_2 i_{11} i_{12} i_{T_1} i_{T_2}} n_I = \frac{6.6}{2.5 i_{T_1} i_{T_2}} n_I;$$

the output-input speed relationship in the double ring transmission T3 is:

$$n_o(T3) = -\frac{1}{i_1 i_2 i_7 i_{T_1} i_{T_2}} n_I = -\frac{1}{0.5 i_{T_1} i_{T_2}} n_I;$$

the output-input speed relationship in the double ring transmission T4 is:

$$n_o(T4) = \frac{1}{i_1 i_2 i_8 i_9 i_{T_1} i_{T_2}} n_I = \frac{1}{0.5 i_{T_1} i_{T_2}} n_I;$$

the output-input speed relationship in the hydraulic transmission H1 is:

$$n_o(H1) = -\frac{e}{(1+k_2)i_3 i_4 i_{10}} n_I = -\frac{e}{2.5} n_I;$$

the output-input speed relationship in the hydraulic transmission H2 is:

$$n_o(H2) = \frac{e}{(1+k_2)i_3 i_4 i_{11} i_{12}} n_I = \frac{e}{2.5} n_I;$$

the output-input speed relationship in the hydraulic transmission H3 is:

$$n_o(H3) = -\frac{e}{i_3 i_4 i_{10}} n_I = -\frac{e}{0.5} n_I;$$

the output-input speed relationship in the hydraulic transmission H4 is:

$$n_o(H4) = \frac{e}{i_3 i_4 i_{11} i_{12}} n_I = \frac{e}{0.5} n_I.$$

As shown in FIG. 20, by adjusting the transmission ratio of the double ring mechanism 5, adjusting the displacement ratio of the hydraulic transmission mechanism 4, and selectively controlling engagement of the clutch assembly, H4 is adopted for forward startup, the output speed increases linearly with the increase of the displacement ratio e of the hydraulic transmission mechanism, and when e=1, the hydraulic transmission H4 reaches a positive maximum value $2n_I$. When $e \cdot i_T \in [n_o(H4)=n_o(T4)=2n_I]$, e=1, and $i_T=1$, the hydraulic transmission H4 can be synchronously switched to the double ring transmission T4, and when the transmission ratio $i_T$ of the double ring transmission mechanism changes from the maximum value to the minimum value, $n_o(T4)$ increases nonlinearly. When the double ring transmission T2 is adopted for forward movement, the output speed increases linearly with the increase of the transmission ratio $i_T$ of the double ring transmission mechanism, and when $i_T=4$, the double ring transmission T2 reaches a positive maximum value $2.64n_I$. When $e \cdot i_T \in [n_o(T4)=n_o(T2)=1.156n_I]$ and $i_T=1.75$, the double ring transmission T2 can be synchronously switched to the double ring transmission T4, and when the transmission ratio $i_T$ of the double ring transmission mechanism changes from the maximum value to the minimum value, $n_o(T4)$ increases nonlinearly. When H3 is adopted for reverse startup, the output speed increases linearly with the increase of the displacement ratio e of the hydraulic transmission mechanism, and when e=1, the hydraulic transmission H3 reaches a negative maximum value $-2n_I$. When $e \cdot i_T \in [n_o(H3)=n_o(T3)=2n_I]$, e=1, and $i_T=1$, the hydraulic transmission H3 can be synchronously switched to the double ring transmission T3, and when the transmission ratio $i_T$ of the double ring transmission mechanism changes from the maximum value to the minimum value, $n_o(T3)$ increases nonlinearly. When the double ring transmission T1 is adopted for reverse movement, the output speed increases linearly with the increase of the transmission ratio $i_T$ of the double ring transmission mechanism, and when $i_T=4$, the double ring transmission T1 reaches a negative maximum value $-2.64n_I$. When $e \cdot i_T \in [n_o(T3)=n_o(T1)=-1.156n_I]$ and $i_T=1.75$, the double ring transmission T1 can be synchronously switched to the double ring transmission T3, and when the transmission ratio $i_T$ of the double ring transmission mechanism changes from the maximum value to the minimum value, $n_o(T3)$ increases nonlinearly.

The output-input speed relationship in the mechanical-double ring composite transmission MT1 is:

$$n_o(MT1) = -\frac{(1+k_1)i_6 + i_1 i_2 i_{T_1} i_{T_2}}{k_1 i_1 i_2 i_6 i_7 i_{T_1} i_{T_2}} n_I = -\frac{1.3 + 0.5 i_{T_1} i_{T_2}}{0.4 i_{T_1} i_{T_2}} n_I;$$

the output-input speed relationship in the mechanical-double ring composite transmission MT2 is:

$$n_o(MT2) = \frac{(1+k_1)i_6 - i_1 i_2 i_{T_1} i_{T_2}}{k_1 i_1 i_2 i_6 i_8 i_9 i_{T_1} i_{T_2}} n_I = \frac{1.3 + 0.5 i_{T_1} i_{T_2}}{0.4 i_{T_1} i_{T_2}} n_I;$$

the output-input speed relationship in the mechanical-double ring composite transmission MT3 is:

$$n_o(MT3) = -\frac{k_2 i_6 - i_1 i_2 i_{T_1} i_{T_2}}{(1+k_2)i_1 i_2 i_6 i_{10} i_{T_1} i_{T_2}} n_I = -\frac{2 - 0.5 i_{T_1} i_{T_2}}{1.25 i_{T_1} i_{T_2}} n_I;$$

the output-input speed relationship in the mechanical-double ring composite transmission MT4 is:

$$n_o(MT4) = \frac{k_2 i_6 - i_1 i_2 i_{T_1} i_{T_2}}{(1+k_2)i_1 i_2 i_6 i_{11} i_{12} i_{T_1} i_{T_2}} n_I = \frac{2 - 0.5 i_{T_1} i_{T_2}}{1.25 i_{T_1} i_{T_2}} n_I;$$

the output-input speed relationship in the mechanical-hydraulic composite transmission MH1 is:

$$n_o(MH1) = \frac{(1+k_1)i_3 i_4 + i_5 e}{k_1 i_3 i_4 i_5 i_7} n_I = \frac{1.3 + 2.5e}{2} n_I;$$

the output-input speed relationship in the mechanical-hydraulic composite transmission MH2 is:

$$n_o(MH2) = -\frac{(1+k_1)i_3 i_4 + i_5 e}{k_1 i_3 i_4 i_5 i_8 i_9} n_I = -\frac{1.3 + 2.5e}{2} n_I;$$

the output-input speed relationship in the mechanical-hydraulic composite transmission MH3 is:

$$n_o(MH3) = \frac{k_2 i_3 i_4 - i_5 e}{(1+k_2)i_3 i_4 i_5 i_{10}} n_I = \frac{2 - 2.5e}{6.25} n_I;$$

the output-input speed relationship in the mechanical-hydraulic composite transmission MH4 is:

$$n_o(MH4) = -\frac{k_2 i_3 i_4 - i_5 e}{(1+k_2)i_3 i_4 i_5 i_{11} i_{12}} n_I = -\frac{2-2.5e}{6.25} n_I.$$

As shown in FIG. 21, by adjusting the transmission ratio of the double ring mechanism 5, adjusting the displacement ratio of the hydraulic transmission mechanism 4, and selectively controlling engagement of the clutch assembly, the mechanical-hydraulic composite transmission MH1 is adopted for forward movement, the output speed increases linearly with the increase of the displacement ratio e of the hydraulic transmission mechanism, and when e=1, the mechanical-hydraulic composite transmission MH1 reaches a positive maximum value $1.9n_I$.

When the mechanical-double ring composite transmission MT2 is adopted for forward movement, the output speed increases nonlinearly with the increase of it. When $e \cdot i_T \in [n_o(MT2)=n_o(MH3)=0.14n_I]$, e=0.575, and $i_T$=0.575, the mechanical-double ring composite transmission MT2 can be synchronously switched to the mechanical-hydraulic composite transmission MH3, and when the displacement ratio e of the hydraulic transmission mechanism changes from the maximum value to the minimum value, $n_o$(MH3) increases linearly. When $e \cdot i_T \in [n_o(MT4)=n_o(MH3)=0.0625n_I]$, e=0.7, and $i_T$=0.7, the mechanical-hydraulic composite transmission MH3 can be synchronously switched to the mechanical-double ring composite transmission MT4, and the output speed decreases nonlinearly with the increase of the transmission ratio $i_T$ of the double ring transmission mechanism. When the mechanical-hydraulic composite transmission MH2 is adopted for reverse movement, the output speed increases linearly with the increase of the displacement ratio e of the hydraulic transmission mechanism, and when e=1, the mechanical-hydraulic composite transmission MH2 reaches a negative maximum value $-1.9n_I$. When the mechanical-double ring composite transmission MT1 is adopted for reverse movement, the output speed increases nonlinearly with the increase of $i_T$. When $e \cdot i_T \in [n_o(MT1)=n_o(MH4)=-0.14n_I]$, e=0.575, and $i_T$=0.575, the mechanical-double ring composite transmission MT1 can be synchronously switched to the mechanical-hydraulic transmission MH4, and when the displacement ratio e of the hydraulic transmission mechanism changes from the maximum value to the minimum value, $n_o$(MH4) increases linearly. When $e \cdot i_T \in [n_o(MT3)=n_o(MH4)=-0.0625n_I]$, e=0.7, and $i_T$=0.7, the mechanical-hydraulic composite transmission MH4 can be synchronously switched to the mechanical-double ring composite transmission MT3, and the output speed decreases nonlinearly with the increase of the transmission ratio $i_T$ of the double ring transmission mechanism.

It should be understood that although this specification is described in accordance with the embodiments, each embodiment does not merely include one independent technical solution. This narrative way of the specification is only for clarity, and persons skilled in the art should regard the specification as a whole. The technical solutions in the embodiments can also be appropriately combined to form other implementations that can be understood by persons skilled in the art.

The above descriptions are merely practical embodiments of the present disclosure, and are not intended to limit the protection scope of the present disclosure. Any equivalent embodiments or modifications made without departing from the spirit of the present disclosure shall fall within the protection scope of the present disclosure.

What is claimed is:

1. A mechanical-double ring-hydraulic composite transmission mechanism, comprising an input member, a convergence mechanism, a hydraulic transmission mechanism, a double ring mechanism, an output member, a clutch assembly, and a brake assembly, wherein the convergence mechanism comprises a left planetary gear train and a right planetary gear train, the clutch assembly connects the left planetary gear train to the right planetary gear train, the clutch assembly connects the input member to the hydraulic transmission mechanism, the double ring mechanism, the left planetary gear train, and the right planetary gear train, the clutch assembly connects the hydraulic transmission mechanism to the right planetary gear train, the clutch assembly connects the double ring mechanism to the left planetary gear train, and the clutch assembly connects the left planetary gear train and the right planetary gear train to the output member; a continuous transmission ratio between the input member and the output member is provided by adjusting a displacement ratio of the hydraulic transmission mechanism, adjusting a transmission ratio of the double ring transmission mechanism, and selectively controlling engagement of the clutch assembly and the brake assembly;

transmission modes comprising mechanical transmissions, double ring transmissions, hydraulic transmissions, mechanical-double ring composite transmissions, and mechanical-hydraulic composite transmissions are provided between the input member and the output member by adjusting the displacement ratio of the hydraulic transmission mechanism, adjusting the transmission ratio of the double ring transmission mechanism, and selectively controlling engagement of the clutch assembly and the brake assembly;

wherein the left planetary gear train comprises a left ring gear, a left planet carrier, and a left sun gear; the right planetary gear train comprises a right ring gear, a right planet carrier, and a right sun gear; the right ring gear is connected to the left planet carrier; and the left sun gear is connected to the right sun gear;

the clutch assembly comprises a fifth clutch ($C_5$), a sixth clutch ($C_6$), a seventh clutch ($C_7$), an eighth clutch ($C_8$), a ninth clutch ($C_9$), a tenth clutch ($C_{10}$), and an eleventh clutch ($C_{11}$), wherein the fifth clutch ($C_5$) is configured for selectively connecting the input member to the left planet carrier; the sixth clutch ($C_6$) is configured for selectively connecting the input member to the right sun gear; the seventh clutch ($C_7$) and the eighth clutch ($C_8$) are configured for selectively connecting the left ring gear to the output member at different speed ratios; the ninth clutch ($C_9$) and the tenth clutch ($C_{10}$) are configured for selectively connecting the right planet carrier to the output member at different speed ratios; and the eleventh clutch ($C_{11}$) is configured for selectively connecting the left planet carrier to the left sun gear;

the brake assembly comprises a first brake ($B_1$), a second brake ($B_2$), and a third brake ($B_3$), wherein the first brake ($B_1$) is configured for selectively connecting the left ring gear to a fixed member; the second brake ($B_2$) is configured for selectively connecting the right ring gear to a fixed member; and the third brake ($B_3$) is configured for selectively connecting the left planet carrier to a fixed member;

forward mechanical transmission (M1) is provided between the input member and the output member by engaging the fifth clutch ($C_5$), the seventh clutch ($C_7$), and the eleventh clutch ($C_{11}$), and a rotation speed of the input member and a rotation speed of the output member in the forward mechanical transmission (M1) satisfy the following relationship:

$$n_o = \frac{1}{i_5 i_7} n_I,$$

wherein $n_o$ is the rotation speed of the output member, $n_I$ is the rotation speed of the input member, $i_5$ is a transmission ratio between the input member and the left planet carrier, and $i_7$ is a transmission ratio between the left ring gear and the output member;

reverse mechanical transmission (M2) is provided between the input member and the output member by engaging the fifth clutch ($C_5$), the eighth clutch ($C_8$), and the eleventh clutch ($C_{11}$), and the rotation speed of the input member and the rotation speed of the output member in the reverse mechanical transmission (M2) satisfy the following relationship:

$$n_o = -\frac{1}{i_5 i_8 i_9} n_I,$$

wherein $i_8 i_9$ is a transmission ratio between the left ring gear and the output member.

2. The mechanical-double ring-hydraulic composite transmission mechanism according to claim 1, wherein the clutch assembly further comprises a first clutch ($C_1$) and a second clutch ($C_2$), wherein the first clutch ($C_1$) is configured for selectively connecting the input member to an input end of the double ring mechanism, and the second clutch ($C_2$) is configured for selectively connecting an output end of the double ring mechanism to the left planet carrier;

a first reverse double ring transmission (T1) is provided between the input member and the output member by adjusting the transmission ratio of the double ring mechanism and engaging the first clutch ($C_1$), the second clutch ($C_2$), the ninth clutch ($C_9$), and the first brake ($B_1$), and the rotation speed of the input member and the rotation speed of the output member in the first reverse double ring transmission (T1) satisfy the following relationship:

$$n_o = -\frac{1 + k_1 + k_2}{(1 + k_2) i_1 i_2 i_{10} i_{T_1} i_{T_2}} n_I,$$

wherein $k_1$ is a planetary gear characteristic parameter of the left planetary gear train, $k_2$ is a planetary gear characteristic parameter of the right planetary gear train, $i_1$ is a transmission ratio between the input member and the input end of the double ring mechanism, $i_2$ is a transmission ratio between the output end of the double ring mechanism and the left planet carrier, $i_{10}$ is a transmission ratio between the right planet carrier and the output member, and $i_{T_1} i_{T_2}$ is the transmission ratio of the double ring mechanism;

a second reverse double ring transmission (T3) is provided between the input member and the output member by adjusting the transmission ratio of the double ring mechanism and engaging the first clutch ($C_1$), the second clutch ($C_2$), the eleventh clutch ($C_{11}$), and the ninth clutch ($C_9$), and the rotation speed of the input member and the rotation speed of the output member in the second reverse double ring transmission (T3) satisfy the following relationship:

$$n_o = -\frac{1}{i_1 i_2 i_7 i_{T_1} i_{T_2}} n_I;$$

a first forward double ring transmission (T2) is provided between the input member and the output member by adjusting the transmission ratio of the double ring mechanism and engaging the first clutch ($C_1$), the second clutch ($C_2$), the first brake ($B_1$), and the tenth clutch ($C_{10}$), and the rotation speed of the input member and the rotation speed of the output member in the first forward double ring transmission (T2) satisfy the following relationship:

$$n_o = \frac{1 + k_1 + k_2}{(1 + k_2) i_1 i_2 i_{11} i_{12} i_{T_1} i_{T_2}} n_I,$$

wherein $i_{11} i_{12}$ is a transmission ratio between the right planet carrier and the output member;

a second forward double ring transmission (T4) is provided between the input member and the output member by adjusting the transmission ratio of the double ring mechanism and engaging the first clutch ($C_1$), the second clutch ($C_2$), the tenth clutch ($C_{10}$), and the eleventh clutch ($C_{11}$), and the rotation speed of the input member and the rotation speed of the output member in the second forward double ring transmission (T4) satisfy the following relationship:

$$n_o = \frac{1}{i_1 i_2 i_8 i_9 i_{T_1} i_{T_2}} n_I.$$

3. The mechanical-double ring-hydraulic composite transmission mechanism according to claim 2, wherein the clutch assembly further comprises a third clutch ($C_3$) and a fourth clutch ($C_4$), wherein the third clutch ($C_3$) connects the input member to an input end of the hydraulic transmission mechanism, and the fourth clutch ($C_4$) connects an output end of the hydraulic transmission mechanism to the right sun gear;

a first reverse hydraulic transmission (H1) is provided between the input member and the output member by adjusting the displacement ratio of the hydraulic transmission mechanism and engaging the third clutch ($C_3$), the fourth clutch ($C_4$), the ninth clutch ($C_5$), the second brake ($B_2$), and the third brake ($B_3$), and the rotation speed of the input member and the rotation speed of the output member in the first reverse hydraulic transmission (H1) satisfy the following relationship:

$$n_o = -\frac{e}{(1 + k_2) i_3 i_4 i_{10}} n_I,$$

wherein e is the displacement ratio of the hydraulic transmission mechanism, $i_3$ is a transmission ratio between the input member and the input end of the hydraulic transmission mechanism, and $i_4$ is a transmission ratio between the output end of the hydraulic transmission mechanism and the right sun gear;

a second reverse hydraulic transmission (H3) is provided between the input member and the output member by adjusting the displacement ratio of the hydraulic transmission mechanism and engaging the third clutch ($C_3$), the fourth clutch ($C_4$), the ninth clutch ($C_9$), and the eleventh clutch ($C_{11}$), and the rotation speed of the input member and the rotation speed of the output member in the second reverse hydraulic transmission (H3) satisfy the following relationship:

$$n_o = -\frac{e}{i_3 i_4 i_{10}} n_I;$$

a first forward hydraulic transmission (H2) is provided between the input member and the output member by adjusting the displacement ratio of the hydraulic transmission mechanism and engaging the third clutch ($C_3$), the fourth clutch ($C_4$), the tenth clutch ($C_{10}$), the second brake ($B_2$), and the third brake ($B_3$), and the rotation speed of the input member and the rotation speed of the output member in the first forward hydraulic transmission (H2) satisfy the following relationship:

$$n_o = \frac{e}{(1+k_2)i_3 i_4 i_{11} i_{12}} n_I;$$

a second forward hydraulic transmission (H4) is provided between the input member and the output member by adjusting the displacement ratio of the hydraulic transmission mechanism and engaging the third clutch ($C_3$), the fourth clutch ($C_4$), the tenth clutch ($C_{10}$), and the eleventh clutch ($C_{11}$), and the rotation speed of the input member and the rotation speed of the output member in the second forward hydraulic transmission (H4) satisfy the following relationship:

$$n_o = \frac{e}{i_3 i_4 i_{11} i_{12}} n_I.$$

4. The mechanical-double ring-hydraulic composite transmission mechanism according to claim 3, wherein a first reverse mechanical-double ring composite transmission (MT1) is provided between the input member and the output member by adjusting the transmission ratio of the double ring mechanism and engaging the first clutch ($C_1$), the second clutch ($C_2$), the sixth clutch ($C_6$), and the seventh clutch ($C_7$), and the rotation speed of the input member and the rotation speed of the output member in the first reverse mechanical-double ring composite transmission (MT1) satisfy the following relationship:

$$n_o = -\frac{(1+k_1)i_6 + i_1 i_2 i_{T_1} i_{T_2}}{k_1 i_1 i_2 i_6 i_7 i_{T_1} i_{T_2}} n_I;$$

a second reverse mechanical-double ring composite transmission (MT3) is provided between the input member and the output member by adjusting the transmission ratio of the double ring mechanism and engaging the first clutch ($C_1$), the second clutch ($C_2$), the sixth clutch ($C_6$), and the ninth clutch ($C_9$), and the rotation speed of the input member and the rotation speed of the output member in the second reverse mechanical-double ring composite transmission (MT3) satisfy the following relationship:

$$n_o = -\frac{k_2 i_6 - i_1 i_2 i_{T_1} i_{T_2}}{(1+k_2)i_1 i_2 i_6 i_{10} i_{T_1} i_{T_2}} n_I;$$

a first forward mechanical-double ring composite transmission (MT2) is provided between the input member and the output member by adjusting the transmission ratio of the double ring mechanism and engaging the first clutch ($C_1$), the second clutch ($C_2$), the sixth clutch ($C_6$), and the eighth clutch ($C_8$), and the rotation speed of the input member and the rotation speed of the output member in the first forward mechanical-double ring composite transmission (MT2) satisfy the following relationship:

$$n_o = \frac{(1+k_1)i_6 - i_1 i_2 i_{T_1} i_{T_2}}{k_1 i_1 i_2 i_6 i_8 i_9 i_{T_1} i_{T_2}} n_I;$$

a second forward mechanical-double ring composite transmission (MT4) is provided between the input member and the output member by adjusting the transmission ratio of the double ring mechanism and engaging the first clutch ($C_1$), the second clutch ($C_2$), the sixth clutch ($C_6$), and the tenth clutch ($C_{10}$), and the rotation speed of the input member and the rotation speed of the output member in the second forward mechanical-double ring composite transmission (MT4) satisfy the following relationship:

$$n_o = \frac{k_2 i_6 - i_1 i_2 i_{T_1} i_{T_2}}{(1+k_2)i_1 i_2 i_6 i_{11} i_{12} i_{T_1} i_{T_2}} n_I.$$

5. The mechanical-double ring-hydraulic composite transmission mechanism according to claim 4, wherein a first forward mechanical-hydraulic composite transmission (MH1) is provided between the input member and the output member by adjusting the displacement ratio of the hydraulic transmission mechanism and engaging the third clutch ($C_3$), the fourth clutch ($C_4$), the fifth clutch ($C_5$), and the seventh clutch ($C_7$), and the rotation speed of the input member and the rotation speed of the output member in the first forward mechanical-hydraulic composite transmission (MH1) satisfy the following relationship:

$$n_o = \frac{(1+k_1)i_3 i_4 + i_5 e}{k_1 i_3 i_4 i_5 i_7} n_I;$$

a second forward mechanical-hydraulic composite transmission (MH3) is provided between the input member and the output member by adjusting the displacement ratio of the hydraulic transmission mechanism and engaging the third clutch ($C_3$), the fourth clutch ($C_4$), the fifth clutch ($C_5$), and the ninth clutch ($C_9$), and the rotation speed of the input member and the rotation speed of the output member in the second forward mechanical-hydraulic composite transmission (MH3) satisfy the following relationship:

$$n_o = \frac{k_2 i_3 i_4 - i_5 e}{(1 + k_2) i_3 i_4 i_5 i_{10}} n_I;$$

a first reverse mechanical-hydraulic composite transmission (MH2) is provided between the input member and the output member by adjusting the displacement ratio of the hydraulic transmission mechanism and engaging the third clutch ($C_3$), the fourth clutch ($C_4$), the fifth clutch ($C_5$), and the eighth clutch ($C_8$), and the rotation speed of the input member and the rotation speed of the output member in the first reverse mechanical-hydraulic composite transmission (MH2) satisfy the following relationship:

$$n_o = -\frac{(1 + k_1) i_3 i_4 + i_5 e}{k_1 i_3 i_4 i_5 i_8 i_9} n_I;$$

a second reverse mechanical-hydraulic composite transmission (MH4) is provided between the input member and the output member by adjusting the displacement ratio of the hydraulic transmission mechanism and engaging the third clutch ($C_3$), the fourth clutch ($C_4$), the fifth clutch ($C_5$), and the tenth clutch ($C_{10}$), and the rotation speed of the input member and the rotation speed of the output member in the second reverse mechanical-hydraulic composite transmission (MH4) satisfy the following relationship:

$$n_o = -\frac{k_2 i_3 i_4 - i_5 e}{(1 + k_2) i_3 i_4 i_5 i_{11} i_{12}} n_I.$$

6. The mechanical-double ring-hydraulic composite transmission mechanism according to claim 5, wherein by adjusting the displacement ratio of the hydraulic transmission mechanism, adjusting the transmission ratio of the double ring transmission mechanism, and selectively controlling engagement of the clutch assembly and the brake assembly, the first forward mechanical-hydraulic composite transmission (MH1) is adopted for forward movement, the output speed increases linearly with an increase of the displacement ratio (e) of the hydraulic transmission mechanism, and when e=1, the first forward mechanical-hydraulic composite transmission (MH1) reaches a positive maximum value; when the first forward mechanical-double ring composite transmission (MT2) is adopted for forward movement, the output speed increases nonlinearly with an increase of $i_T$; when $e \cdot i_T \in [n_o(\text{MT2}) = n_o(\text{MH3})]$, $e \in [0, 1]$, and $i_{T_1} i_{T_2}$ falls in a determined transmission ratio range, the first forward mechanical-double ring composite transmission (MT2) is configured for being synchronously switched to the second forward mechanical-hydraulic composite transmission (MH3), and when the displacement ratio (e) of the hydraulic transmission mechanism changes from a maximum value to a minimum value, $n_o(\text{MH3})$ increases linearly; when $e \cdot i_T \in [n_o(\text{MT4}) = n_o(\text{MH3})]$, $e \in [0, 1]$, and the $i_{T_1} i_{T_2}$ falls in a determined transmission ratio range, the second forward mechanical-hydraulic composite transmission (MH3) is configured for being synchronously switched to the second forward mechanical-double ring composite transmission (MT4), and the output speed decreases nonlinearly with the increase of a transmission ratio ($i_T$) of the double ring transmission mechanism;

when the first reverse mechanical-hydraulic composite transmission (MH2) is adopted for reverse movement, the output speed increases linearly with the increase of the displacement ratio (e) of the hydraulic transmission mechanism, and when e=1, the first reverse mechanical-hydraulic composite transmission (MH2) reaches a negative maximum value; when the first reverse mechanical-double ring composite transmission (MT1) is adopted for reverse movement, the output speed increases nonlinearly with an increase of the $i_{T_1} i_{T_2}$; when $e \cdot i_T \in [n_o(\text{MT1}) = n_o(\text{MH4})]$, $e \in [0, 1]$, and the $i_{T_1} i_{T_2}$ falls in a determined transmission ratio range, the first reverse mechanical-double ring composite transmission (MT1) is configured for being synchronously switched to the second forward mechanical-hydraulic composite transmission (MH4); when the displacement ratio (e) of the hydraulic transmission mechanism changes from the maximum value to the minimum value, $n_o(\text{MH4})$ increases linearly; when $e \cdot i_T \in [n_o(\text{MT3}) = n_o(\text{MH4})]$, $e \in [0, 1]$, and the $i_{T_1} i_{T_2}$ falls in a determined transmission ratio range, the second forward mechanical-hydraulic composite transmission (MH4) is configured for being synchronously switched to the second reverse mechanical-double ring composite transmission (MT3), and the output speed decreases nonlinearly with the increase of the $i_{T_1} i_{T_2}$ of the double ring transmission mechanism.

7. The mechanical-double ring-hydraulic composite transmission mechanism according to claim 3, wherein by adjusting the displacement ratio of the hydraulic transmission mechanism, adjusting the transmission ratio of the double ring transmission mechanism, and selectively controlling engagement of the clutch assembly and the brake assembly, the second forward hydraulic transmission (H4) is adopted for startup, the output speed increases linearly with an increase of the displacement ratio (e) of the hydraulic transmission mechanism, and when e=1, the second forward hydraulic transmission (H4) reaches a positive maximum value;

when $e \cdot i_T \in [n_o(\text{H4}) = n_o(\text{T4})]$, $e \in [0, 1]$, and $i_{T_1} i_{T_2}$ falls in a determined transmission ratio range, the second forward hydraulic transmission (H4) is configured for being synchronously switched to the second forward double ring transmission (T4), and when the $i_{T_1} i_{T_2}$ of the double ring transmission mechanism changes from a maximum value to a minimum value, $n_o(\text{T4})$ increases nonlinearly; when $e \cdot i_T \in [n_o(\text{T4}) = n_o(\text{T2})]$ and the $i_{T_1} i_{T_2}$ falls in a determined transmission ratio range, the first forward double ring transmission (T2) is configured for being synchronously switched to the second forward double ring transmission (T4), and when a transmission ratio ($i_T$) of the double ring transmission mechanism changes from the maximum value to the minimum value, $n_o(\text{T4})$ increases nonlinearly;

when the second reverse hydraulic transmission (H3) is adopted for reverse startup, the output speed increases linearly with the increase of the displacement ratio (e) of the hydraulic transmission mechanism, and when e=1, the second reverse hydraulic transmission (H3) reaches a negative maximum value; when $e \cdot i_T \in [n_o(\text{H3}) = n_o(\text{T3})]$, $e \in [0, 1]$, and $i_{T_1} i_{T_2}$ falls in a determined transmission ratio range, the second reverse hydraulic transmission (H3) is configured for being synchronously switched to the second reverse double ring transmission (T3), and when the $i_{T_1}i_{T_2}$ of the double ring transmission mechanism changes from the maximum value to the minimum value, $n_o(T3)$ increases nonlinearly;

when the first reverse double ring transmission (T1) is adopted for reverse movement, the output speed increases linearly with an increase of the transmission ratio ($i_T$) of the double ring transmission mechanism, and when the $i_{T_1}i_{T_2}$=max, the first reverse double ring transmission (T1) reaches a negative maximum value; when $e \cdot i_T \in [n_o(T3)=n_o(T1)]$ and the $i_{T_1}i_{T_2}$ falls in a determined transmission ratio range, the first reverse double ring transmission (T1) is configured for being synchronously switched to the second reverse double ring transmission (T3), and when the $i_{T_1}i_{T_2}$ of the double ring transmission mechanism changes from the maximum value to the minimum value, $n_o(T3)$ increases nonlinearly.

* * * * *